United States Patent [19]
Sato et al.

[11] Patent Number: 5,097,323
[45] Date of Patent: Mar. 17, 1992

[54] LIQUID CRYSTAL PROJECTOR

[75] Inventors: Makoto Sato, Fussa; Masahiro Ogawa, Musashimurayama; Tatsuo Shimazaki, Tokyo; Hideki Nakamura, Hamura, all of Japan

[73] Assignee: Casio Computer Co., Ltd., Tokyo, Japan

[21] Appl. No.: 424,128

[22] Filed: Oct. 19, 1989

Related U.S. Application Data

[63] Continuation-in-part of Ser. No. 300,078, Jan. 19, 1989.

[30] Foreign Application Priority Data

| Jan. 25, 1988 | [JP] | Japan | 63-7068[U] |
| Jan. 25, 1988 | [JP] | Japan | 63-7069[U] |
| Jan. 28, 1988 | [JP] | Japan | 63-8818[U] |
| Nov. 10, 1988 | [JP] | Japan | 63-146960[U] |
| Apr. 28, 1989 | [JP] | Japan | 1-49713[U] |
| Jun. 30, 1989 | [JP] | Japan | 1-169436 |

[51] Int. Cl.⁵ .......................... H04N 9/31; H04N 9/30
[52] U.S. Cl. ............................. 358/60; 358/61; 353/31; 353/34; 359/40; 359/70; 359/634
[58] Field of Search ..................... 358/60–63, 358/230–231; 350/331 R, 171–174, 345, 401–403, 394, 397, 398, 452, 445; 353/31, 34

[56] References Cited

U.S. PATENT DOCUMENTS

| 1,319,292 | 10/1919 | Kunz | 350/173 |
| 2,604,813 | 7/1952 | Gretener | 350/171 |
| 4,437,126 | 3/1984 | Gottschalk | 358/224 |
| 4,796,978 | 1/1989 | Tanaka et al. | 350/397 |
| 4,864,390 | 9/1989 | McKechnie et al. | 350/345 |
| 4,935,758 | 6/1990 | Miyatake | 353/31 |
| 4,943,154 | 7/1990 | Miyatake et al. | 353/31 |
| 4,989,076 | 1/1991 | Owada et al. | 358/61 |

FOREIGN PATENT DOCUMENTS

| 0182987 | 7/1988 | Japan . |
| 63-196192 | 8/1988 | Japan . |
| 63-216025 | 9/1988 | Japan . |
| 63-240525 | 10/1988 | Japan . |

Primary Examiner—James J. Groody
Assistant Examiner—Safet Metjahic
Attorney, Agent, or Firm—Frishauf, Holtz, Goodman & Woodward

[57] ABSTRACT

A liquid crystal projector of the type, wherein the light emitted from a light source is split into a red beam, a green beam, and a blue beam, and these beams are applied to red-image, green-image, and blue-image display LCD panels, the red-image beam, the green-image beam, and the blue-image beam emerging from these LCD panels are combined and projected by a projection lens, thereby to form a full-color image. The projector has an optical system which guides the beams such that these beam have optical paths of the same length which extend from the light source or the LCD panels to the projection lens.

9 Claims, 19 Drawing Sheets

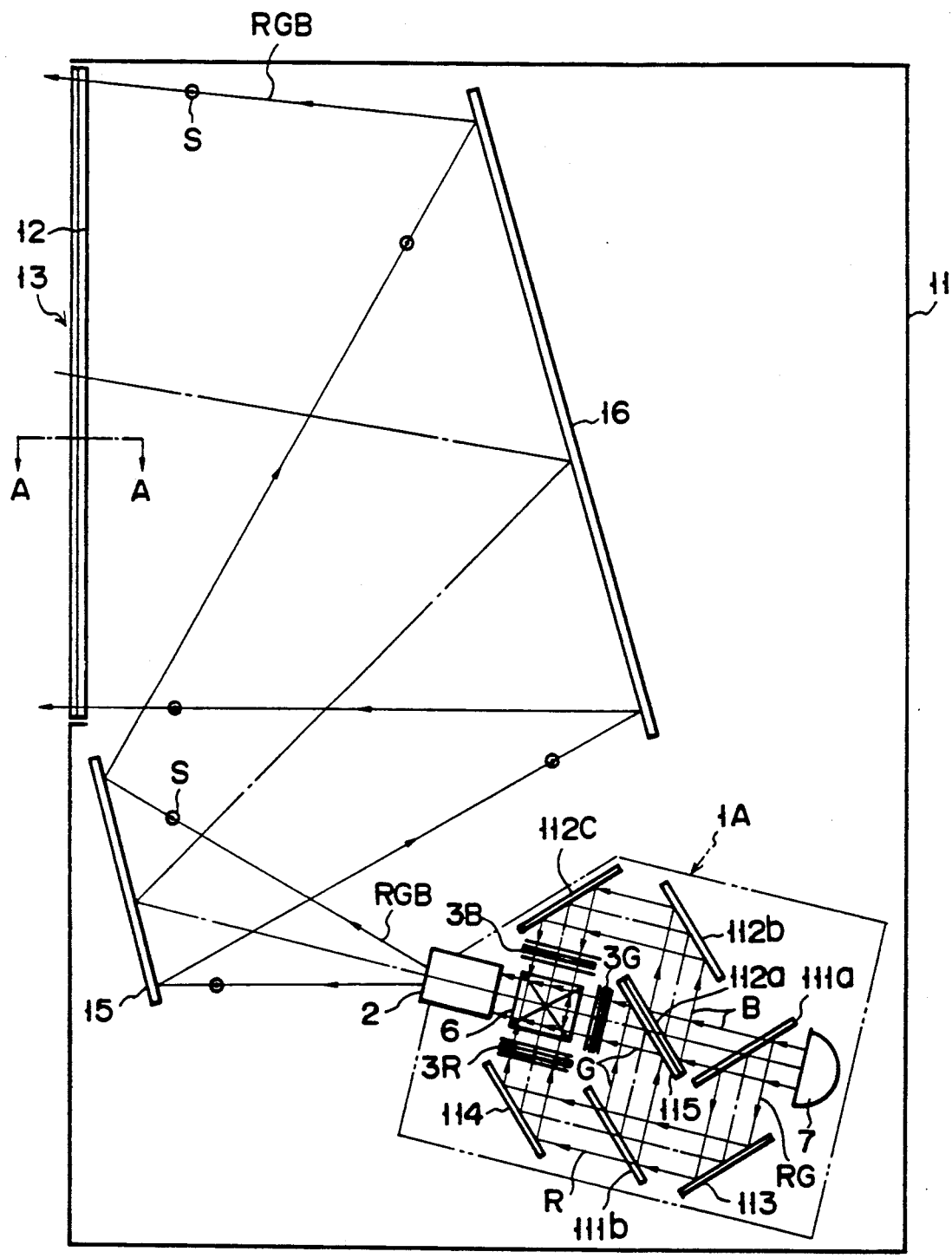
F I G. 5

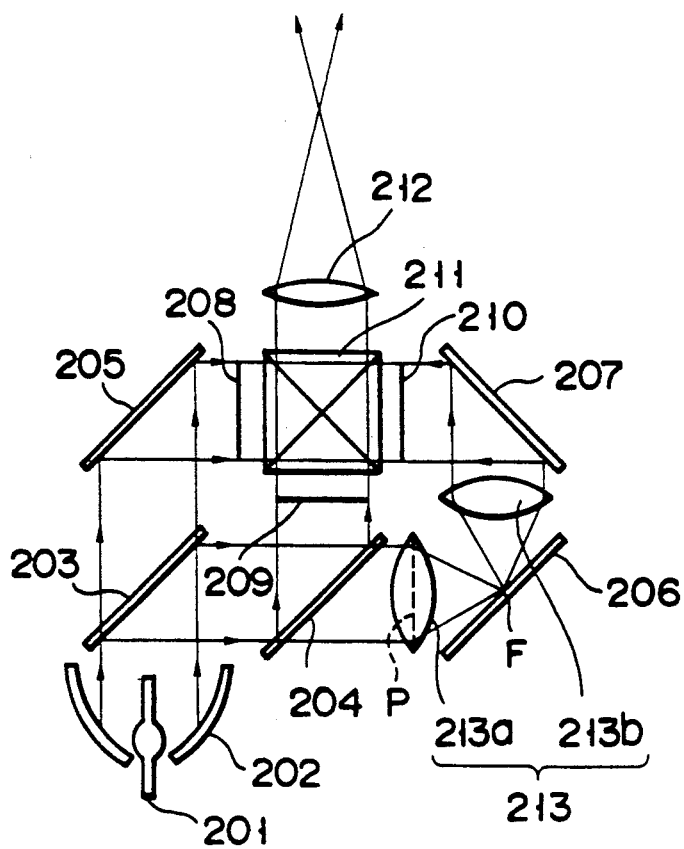
F I G. 7
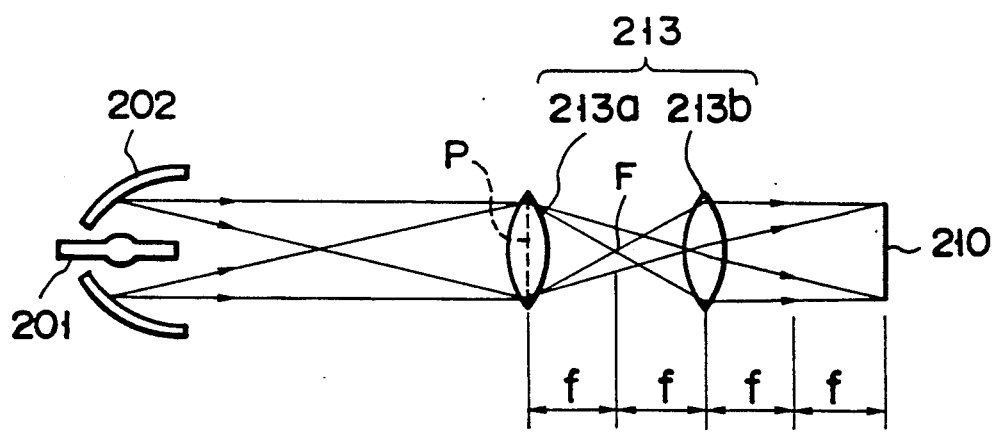
F I G. 8

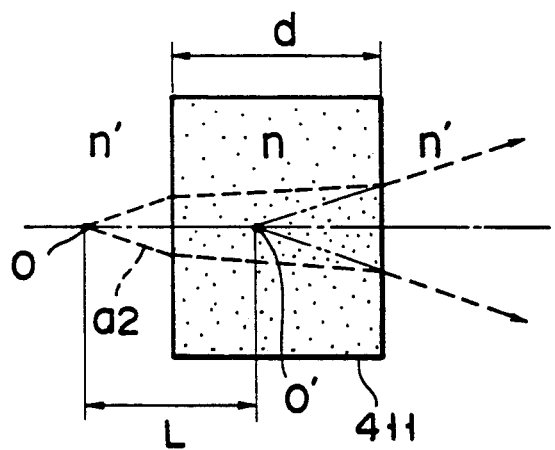
F I G. 12
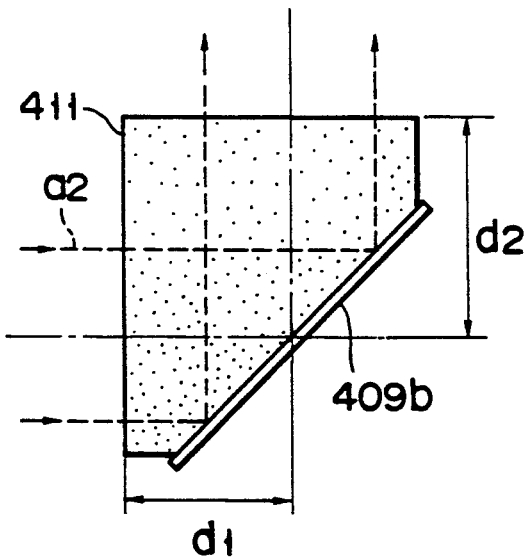
F I G. 13

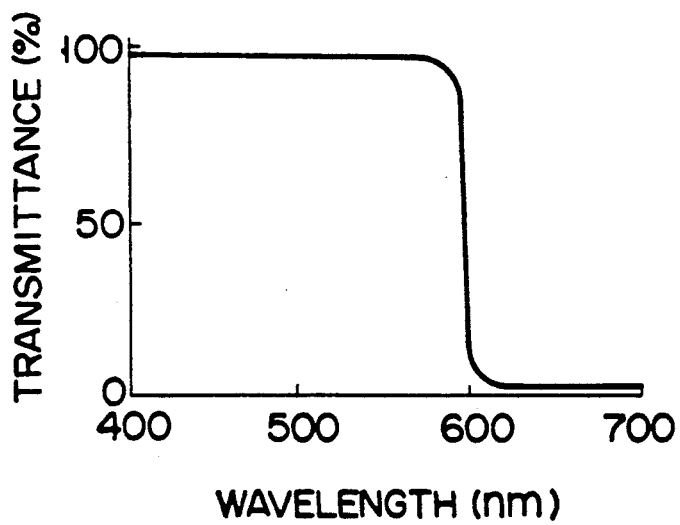
F I G. 18
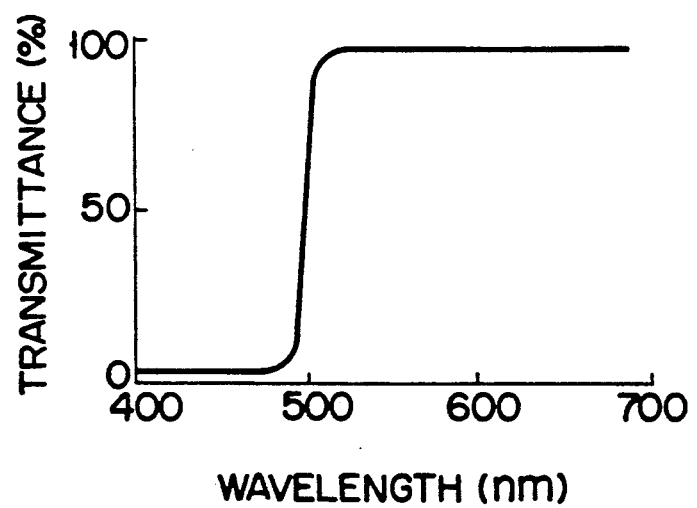
F I G. 19

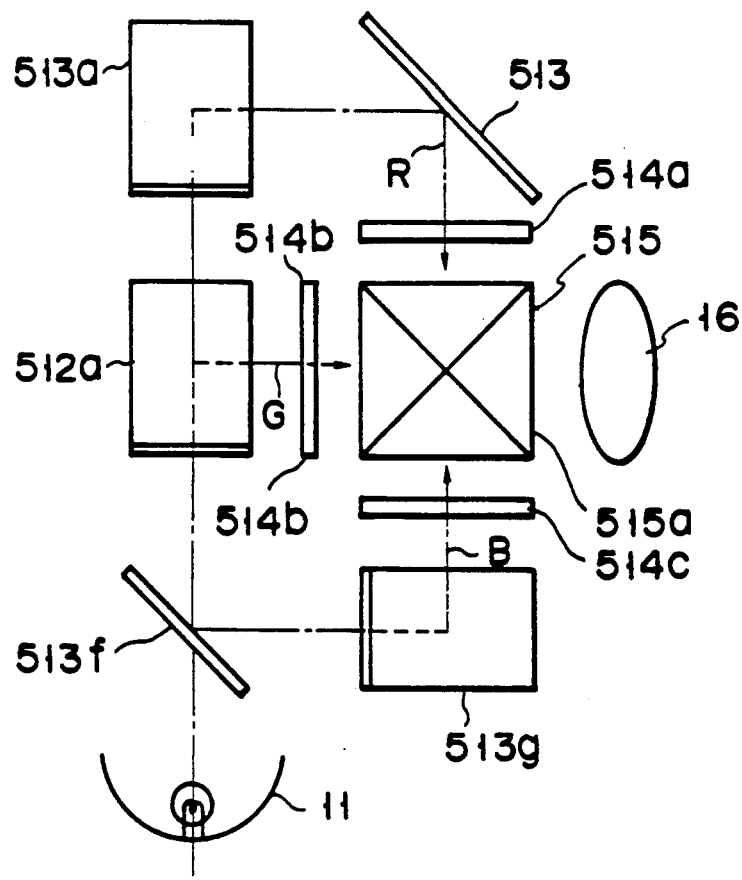
F I G. 21
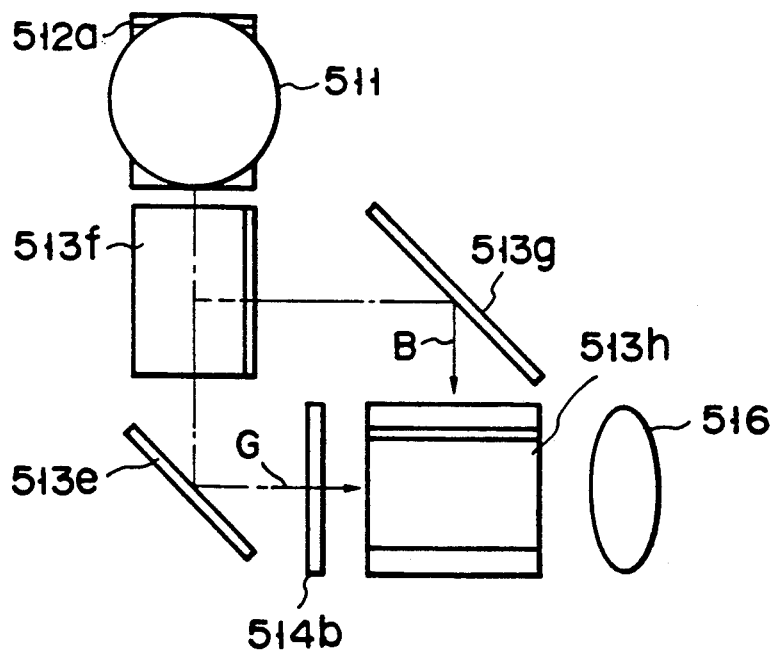
F I G. 22

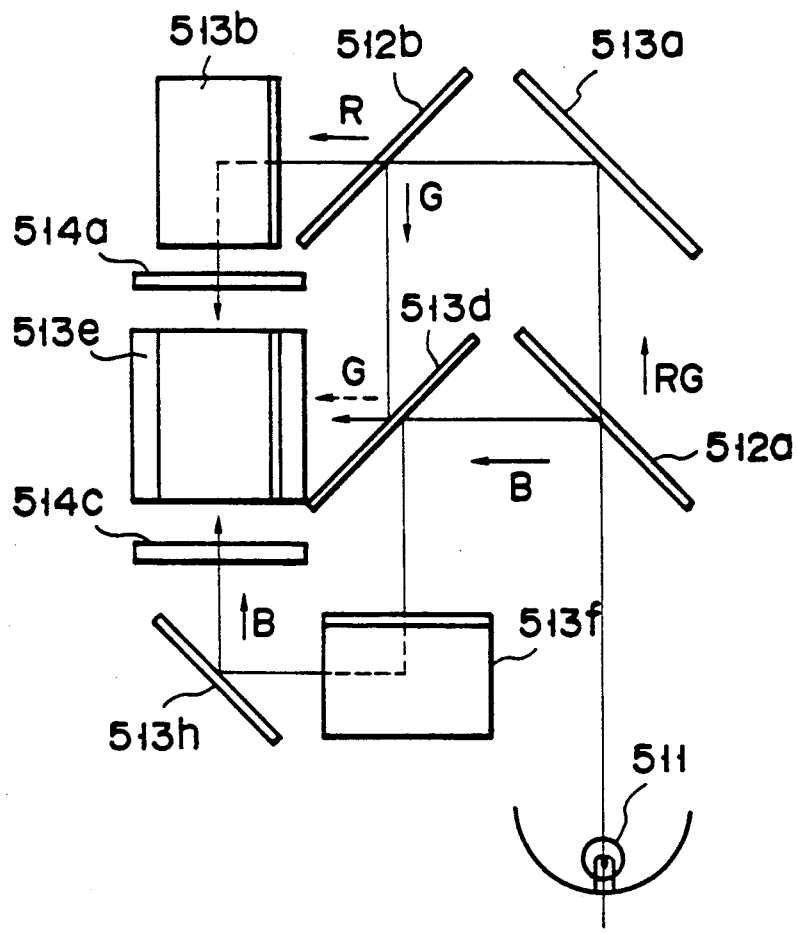
F I G. 23

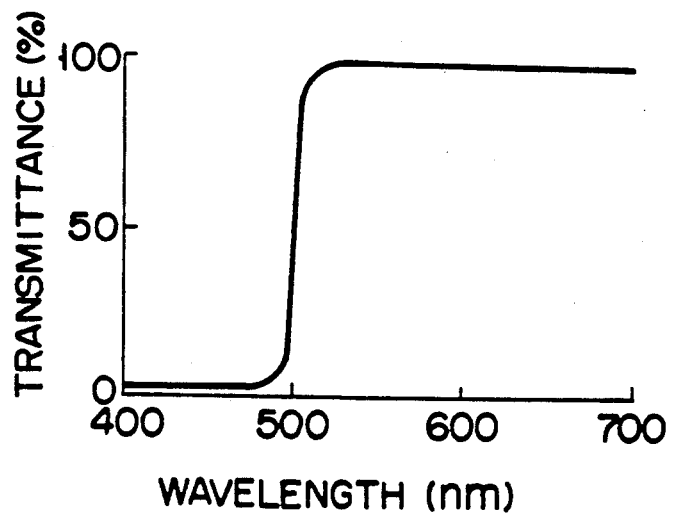
F I G. 24
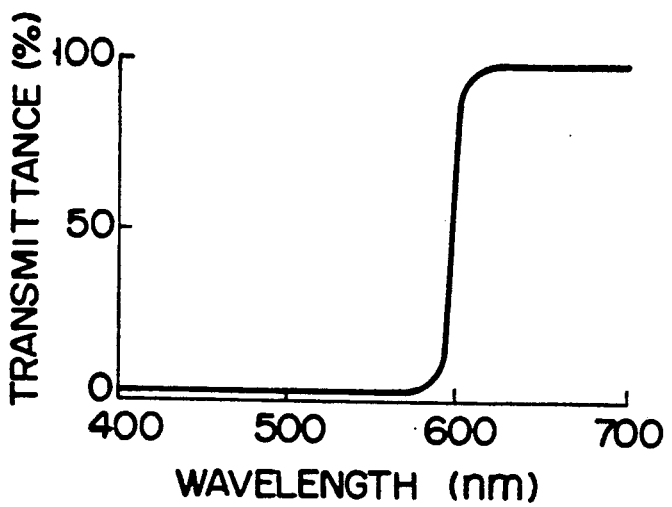
F I G. 25

LIQUID CRYSTAL PROJECTOR

CROSS REFERENCES TO RELATED APPLICATION

This application is a continuation-in-part of U.S. application Ser. No. 300,078, filed Jan. 19, 1989, by Makoto SATO et al.

BACKGROUND OF THE INVENTION

1. Field of the Invention

This invention relates to a liquid crystal projector and, more particularly, to a liquid crystal projector for projecting/displaying a full-color image on a screen.

2. Description of the Related Art

A projector for enlarging an image displayed on a liquid crystal panel and projecting/displaying the enlarged image on a screen by using a projection lens has been recently developed as a liquid crystal projector for displaying a television image and the like by using a liquid crystal panel. In a liquid crystal projector of this type, an image displayed on a liquid crystal panel is enlarged and displayed on a screen. Therefore, if a liquid crystal panel for displaying a full-color image by combining three primary color pixels, i.e., red, green, and blue pixels, is used, an image enlarged/projected onto the screen becomes a lower-solution image in which red, green, and blue pixels are undesirably conspicuous.

A liquid crystal projector comprising three liquid crystal panels, namely, first, second, and third panels, therefore, has been proposed as the above-described projection type liquid crystal projector. In this liquid crystal projector, the first liquid crystal panel a first color image of the three primary color (red, green, and blue) images, and the second and third liquid crystal panels respectively display second and third color images. With this arrangement, a full-color image beam is formed by superposing red, green, and blue image beams transmitted through the respective liquid crystal panels, and is projected on the screen. According to this projector, since each pixel of a full-color image projected on the screen is a full-color image obtained by superposing red, green, and blue pixels, the quality of an image projected on the screen can be greatly improved as compared with the projector in which a full-color image projected on the screen consists of red, green, and blue pixels alternately displayed on a single display panel.

According to a known liquid crystal projector of this projection type, the liquid crystal panels respectively comprise red, green, and blue color filters, and light sources are arranged for the respective liquid crystal panels. Since this projector requires three light sources, the cost is increased, and moreover, power consumption becomes high. For this reason, a system using a single light source has been recently studied. In this system, a beam from this light source is separated by a dichroic mirror into three primary color (red, green, and blue) beams, and the obtained first, second, and third color beams are respectively caused to be incident on first, second, and third liquid crystal panels.

FIG. 1 shows a conventional projection type liquid crystal projector in which a beam from a single light source is separated into three primary color (red, green, and blue) beams so as to be respectively incident on three liquid crystal panels, and a full-color image beam formed by superposing the beams transmitted through the respective liquid crystal panels is projected on a screen.

Referring to FIG. 1, reference numeral 1 denotes a projection unit of the projector. Projection lens 2 is arranged at the front surface of unit 1.

Reference symbol 3R denotes a liquid crystal panel for displaying a red image (to be referred to as a red image display liquid crystal panel hereinafter); 3G, a liquid crystal panel for displaying a green image (to be referred to as a green image display liquid crystal panel hereinafter); and 3B, a liquid crystal panel for displaying a blue image (to be referred to as a blue image display liquid crystal panel hereinafter).

Liquid crystal panels 3R, 3G, and 3B respectively comprise incident beam polarizing plates 4 on their incident surfaces and image forming polarizing plates 5 on their output surfaces. In addition, the liquid crystal in each liquid crystal panel is twisted/aligned at about 90° or 270° with respect to the polarizing axis of incident beam polarizing plate 4, thereby constituting a TN (twisted nematic) type liquid crystal panel.

Each image forming polarizing plate 5 is arranged such that its polarizing axis is parallel or perpendicular to the polarizing axis of corresponding incident beam polarizing plate 4.

Liquid crystal panels 3R, 3G, and 3B have the same pixel arrangement, and respectively display images of red, green, and blue color components of a single full-color image. One of liquid crystal panels 3R, 3G, and 3B, e.g., green image display liquid crystal panel 3G, is arranged such that its output surface opposes projection lens 2.

Reference numeral 6 denotes an image mixing dichroic prism arranged between liquid crystal panel 3G and projection lens 2. The other two liquid crystal panels, i.e., red and blue image display liquid crystal panels 3R and 3B, are arranged such that their output surfaces oppose both side surfaces of dichroic prism 6.

Reference numeral 7 denotes a light source for emitting beams onto liquid crystal panels 3R, 3G, and 3B. Light source 7 opposes green image display liquid crystal panel 3G, which opposes projection lens 2 through dichroic prism 6, of liquid crystal panels 3R, 3G, and 3B. Light source 7 comprises a light source lamp and a reflector for reflecting light emitted from the light source lamp toward liquid crystal panel 3G. A parabolic mirror reflector, for reflecting light emitted from the light source lamp as a collimated beam, is used as the reflector.

Reference symbols 8a and 8b denote two dichroic mirrors combined in an X shape and arranged between light source 7 and liquid crystal panel 3G. Dichroic mirror 8a serves as a red beam separating mirror for reflecting a beam having a red color component wavelength and transmitting beams having other wavelengths. Dichroic mirror 8b serves as a blue beam separating mirror for reflecting a beam having a blue color component wavelength and transmitting beams having other wavelengths. Two dichroic mirrors 8a and 8b separate light emitted from light source 7 into the three primary color (red, green, and blue) beams.

Of light emitted from light source 7, a beam having a green color component wavelength is transmitted through both dichroic mirrors 8a and 8b to be separated. A beam having a red color component wavelength is transmitted through blue beam separating dichroic mirror 8b and is reflected by red beam separating dichroic mirror 8a so as to be separated. A beam having a blue color component wavelength is transmitted through dichroic mirror 8a and is reflected by dichroic mirror 8b so as to be separated.

Green beam G of the red, green, and blue beams separated by dichroic mirrors 8a and 8b is directly incident on green image display liquid crystal panel 3G. Red and blue beams R and B are sequentially reflected by two pairs of reflecting mirrors 9a and 9b, and 10a and 10b so as to be incident on red and blue image display liquid crystal panels 3R and 3B, respectively.

Image mixing dichroic prism 6 mixes the beams transmitted through liquid crystal panels 3R, 3G, and 3B and image forming polarizing plates 5 arranged on their output surfaces, i.e., the red, green, and blue image beams, to form a single image beam. The green image beam incident on dichroic prism 6 from its front surface side propagates straight through dichroic prism 6. The red and blue image beams incident on dichroic prism 6 on both its sides are refracted by dichroic prism 6 in the same direction as that of the green image beam. With this operation, dichroic prism 6 mixes three color image beams to form a single image beam, i.e., a full-color image beam in which the red, green, and blue image beams are superposed on each other. This full-color image beam is projected on screen SC arranged in front of projection lens 2.

More specifically, in this projection type liquid crystal projector, light from single light source 7 is separated into three primary color (red, green, and blue) beams by dichoric mirrors 8a and 8b, the red, green, and blue beams are respectively caused to be incident on red, green, and blue display liquid crystal panels 3R, 3G, and 3B, a full-color image beam is formed by superposing the red, green, and blue beams transmitted through liquid crystal panels 3R, 3G, and 3B by using dichroic prism 6, and the full-color image beam is enlarged and projected on screen SC by using projection lens 2. According to this projection type liquid crystal projector, three liquid crystal panels can be used with a single light source. In addition, since colored beams, i.e., red, green, and blue beams, are incident on liquid crystal panels 3R, 3G, and 3B, no color filter is required for each liquid crystal panel.

In the above-described projection type liquid crystal projector, however, green beam G of the three primary color (red, green, and blue) beams separated by dichroic mirrors 8a and 8b is directly incident on green image display liquid crystal panel 3G, whereas red and blue beams R and B are sequentially reflected by reflecting mirrors 9a and 9b, and 10a and 10b so as to be respectively incident on red and blue image display liquid crystal panels 3R and 3B. As a result, the polarization axis direction of green beam G incident on liquid crystal panel 3G and that of red and blue beams R and B respectively incident on liquid crystal panels 3R and 3B differ from each other. For this reason, in order to efficiently cause beams to be incident on liquid crystal panels 3R, 3G, and 3B, the polarizing axis of polarizing plate 4 and the alignment direction of the liquid crystal for liquid crystal panel 3G must differ from those for liquid crystal panels 3R and 3B.

As described above, beams incident on liquid crystal panels 3R, 3G, and 3B become beams having different polarization axis directions because of the polarization effects of dichroic mirrors 8a and 8b and reflecting mirrors 9a, 9b, 10a, and 10b. Of beams transmitted through dichroic mirrors 8a and 8b, P-polarized light components which are oscillated in a direction perpendicular to the optical axis on surfaces (parallel to the surface of the drawing) perpendicular to the surfaces of dichroic mirrors 8a and 8b and parallel to their tilt directions are subjected to almost no attenuation, and hence are transmitted through dichroic mirrors 8a and 8b at high transmittance. In contrast to this, S-polarized light components which are oscillated in a direction perpendicular to the optical axis on surfaces (perpendicular to the surface of the drawing) perpendicular to the tilt directions of dichroic mirrors 8a and 8b are attenuated to some extent when they are transmitted through dichroic mirrors 8a and 8b. Therefore, a beam transmitted through each dichroic mirror has a P-polarized light component with a high intensity.

Note that the transmittance ratio of a P-polarized light component to an S-polarized light component of a beam transmitted through a single dichroic mirror varies depending on the material of the dichroic mirror, the wavelength of the beam, and the like. For example, it is 10:9. In contrast to a beam transmitted through the dichroic mirror, in a beam reflected by the dichroic mirror, an S-polarized light component is reflected at a high reflectivity, and a P-polarized light component is attenuated to some extent. As a result, the beam reflected by the dichroic mirror has an S-polarized light component with a high intensity (in this case, the reflectivity ratio of the S-polarized light component to the P-polarized light component is, for example, about 10:9).

Similarly, in a beam reflected by a light reflecting mirror, an S-polarized light component is reflected at a high reflectivity, whereas a P-polarized light component is attenuated to a certain extent. Therefore, the beam reflected by the light reflecting mirror also has an S-polarized light component with a high intensity, though this effect is not so noticeable as with the dichroic mirror.

In the conventional projection type liquid crystal projector, therefore, when green beam G incident on liquid crystal panel 3G is transmitted through two dichroic mirrors 8a and 8b, its S-polarized light component is attenuated twice. Red and blue beams R and B incident on liquid crystal panels 3R and 3B are transmitted through one of dichroic mirrors 8a and 8b and are reflected by the other thereof. As a result, red and blue beams R and B separated by dichroic mirrors 8a and 8b have S- and P-polarized light components with substantially equal intensities. However, since red and blue beams R and B are respectively reflected by two pairs of reflecting mirrors 9a and 9b, and 10a and 10b and are incident on liquid crystal panels 3R and 3B, their P-polarized light components are greatly attenuated.

For this reason, in the conventional projector, a panel using a P-polarized light component (in which the polarization axis direction of incident light polarizing plate 4 is matched with the oscillating direction of the P-polarized beam and its liquid crystal is twist-aligned with respect to the polarization axis direction of polarizing plate 4) is used as green image display liquid crystal panel 3G on which green beam G whose S-polarized light component is attenuated twice through two dichroic mirrors 8a and 8b is incident. In addition, panels each using an S-polarized light component (in which the polarization axis direction of polarizing plate 4 is matched with the oscillating direction of an S-polarized beam and its liquid crystal is twist-aligned with respect to the polarization axis direction of polarizing plate 4)

are respectively used as red and blue image display liquid crystal panels on which red and blue beams R and B, in which P-polarized light components are greatly attenuated after they are separated by dichroic mirrors 8a and 8b and are reflected by reflecting mirrors 9a, 9b, 10a, and 10b, are incident This arrangement enables efficient incidence of beams on liquid crystal panels 3R, 3G, and 3B. However, this arrangement requires a single liquid crystal panel using P-polarized light components and two liquid crystal panels using S-polarized light components, and hence two types of panels must be manufactured.

In addition, in the conventional projection type liquid crystal projector, red and blue beams R and B which are incident on liquid crystal panels 3R and 3B from light source 7 have substantially the same optical path length. However, green beam G incident on liquid crystal panel 3G has a shorter optical path length than red and blue beams R and B. As a result, the intensity of green beam G incident on liquid crystal panel G different from the intensities of red and blue beams R and B incident on liquid crystal panels 3R and 3B. Thus, a full-color image projected on Screen SC has a poor color balance.

This phenomenon occurs because red, green, and blue beams, which are incident on liquid crystal panels 3R, 3G, and 3B, diverge. More specifically, if light from light source 7 is perfectly collimated, the illuminance per unit area of each of red, green, and blue beams incident on liquid crystal panels 3R, 3G, and 3B is unchanged from the illuminance at the time when it is separated by dichroic mirrors 8a and 8b. In practice however, light from light source 7 is not perfectly collimated and hence propagates while diverging to some extent, even though the reflector of light source 7 is a parabolic mirror reflector. Therefore, as an optical path from light source 7 increases in length, beams diverge widely. For this reason, if the optical path lengths from light source 7 to liquid crystal panels 3R, G, and 3B are different from each other as in the conventional projection type liquid crystal projector, red and blue beams R and B which are respectively incident on liquid crystal panels 3R and 3B diverge more than green beam G which is incident on liquid crystal panel 3G having a shorter optical path from light source 7 than liquid crystal panels 3R and 3B. As a result, the illuminance per unit area of beams incident on liquid crystal panels 3R and 3B is decreased, and the intensities of the beams incident on these panels are also decreased. Therefore, in each beam of the red, green, and blue beams transmitted through liquid crystal panels R, 3G, and 3B, the intensity of the green beam is higher than the intensities of the red and blue beams. Consequently, a full-color image beam projected on screen SC has a poor color balance, in which green has a high saturation level and red and blue have low saturation levels.

The above-described projection type liquid crystal projector includes a projector for projecting an image on an external screen and a rear-projection type projector in which a transmission type screen is arranged in front of the projector, and display images from incorporated liquid crystal panels are projected on the transmission type screen from its rear surface side so that an image projected on the screen can be viewed from the front surface side. In the latter rear-projection type liquid crystal projector, an image beam which is transmitted through a projection lens is reflected by a projection mirror and is projected on a screen in order to decrease the depth of the projector.

FIG. 2 shows a conventional rear-projection type liquid crystal projector in which light from a single light source is separated into three primary color beams so as to be respectively incident on three liquid crystal panels, and a full-color image beam formed by superposing beams transmitted through these liquid crystal panels on each other is projected on a transmission type screen arranged in front of the projector.

Referring to FIG. 2, reference numeral 11 denotes a case. A display window is formed in the front surface of case 11. Transmission type screen 12 is arranged on the display window. Transmission type screen 12 is designed such that a plurality of vertical or horizontal (vertical in FIG. 2) stripe lens portions each having a small width are parallel formed on a surface of a transparent sheet made of, e.g., an acrylic resin so as to constitute lenticular lens 13.

Projection unit 1 having the same arrangement as that shown in FIG. 1 is housed in case 11.

Reference numerals 15 and 16 denote projection mirrors. A projection beam (full-color image) from projection unit 1 is reflected by first projection mirror 15 toward second projection mirror 16, and is further reflected by second projection mirror 16 toward screen 12.

That is, this rear-projection type liquid crystal projector is designed to project a full-color image beam from projection unit 1, which is obtained in the same manner as described with reference to FIG. 1, on transmission type screen 12 in front of case 11 through projection mirrors 15 and 16.

According to this projector, therefore, an image beam projected by projection lens 2 is projected on screen 12 through an optical path which is bent by projection mirrors 15 and 16. This arrangement can decrease the depth of the projector as compared with the system in which a projection lens is arranged to directly oppose a screen.

In the rear-projection type liquid crystal projector which employs the system of projecting an image beam projected from projection lens 2 on screen 12 by reflecting the image beam using projection mirrors 15 and 16 so as to decrease the depth of the projector, however, the poor color balance of the full-color image beam projected on screen 12, which is caused by projection unit 1 shown in FIG. 2, is further degraded even if a panel using a P-polarized light component is used as green image display liquid crystal panel 3G, and panels using S-polarized light components are respectively used as red and blue image display liquid crystal panels 3R and 3B. This is because, similar to light reflecting mirrors 9a, 9b, 10a, and 10b described above, projection mirrors 15 and 16 reflect an S-polarized light component at a high reflectivity, but reflect a P-polarized light component at a low reflectivity. Therefore, for example, if the polarization axis direction of image forming polarizing plates 5 arranged on the output surfaces of liquid crystal panels 3R, 3G, and 3B is parallel to that of incident light polarizing plates 4 (the oscillating direction of an image beam transmitted through each polarizing plate 5 coincides with that of a beam incident on a corresponding liquid crystal panel), a green image beam which is a P-polarized beam is attenuated every time it is reflected by projection mirrors 15 and 16. As a result, the poor color balance of the full-color image beam projected on screen 12 caused by projection unit 1 in FIG. 2, in which the saturation level of green is low, is further degraded. In contrast to this, assume that the polarization axis direction of image forming polarizing plates 5 of liquid crystal panels 3R, 3G, and 3B is set to be perpendicular to the polarization axis direction of incident light polarizing plates 4 (the oscillating direction of an image beam transmitted through each polarizing plate 5 is perpendicular to that of a beam incident on a corresponding liquid crystal panel). In this case, a green image beam becomes an S-polarized beam, but red and blue image beams become P-polarized beams. Therefore, the red and blue image beams are attenuated every time they are the poor color balance of the full-color image beam projected on screen 12, which is caused by projection unit itself in FIG. 2, is further degraded.

In addition, according to the rear-projection type liquid crystal projector shown in FIG. 2, lenticular lens 13 having a plurality of stripe lens portions each having a small width is formed on the front surface of the transmission type screen so that an image beam transmitted through screen 12 from its rear surface side to its front surface side is spread by lenticular lens 3 so as to increase the viewing angle of an image projected on screen 12.

In the rear-projection type liquid crystal projector comprising transmission type screen 12 having lenticular lens 13 formed on its surface so as to increase the viewing angle of an image projected thereon, however, if a panel using a P-polarized light component is used as green image display liquid crystal panel 3G, and panels using S-polarized light components are respectively used as red and blue image display liquid crystal panels 3R and 3B, the transmittance of a green image beam or red and blue image beams of a full-color image beam projected on screen 12 is decreased, and the poor color balance of a full-color image beam projected on screen 12, which is caused by projection unit 1 in FIG. 2, is further degraded. This degradation is caused by surface reflection of lenticular lens 13 on the surface of screen 12. Of beams incident on the lens portions of lenticular lens 13 on screen 12, a beam oscillated in the widthwise direction of the lens portions is reflected at the lowest reflectivity, whereas a beam oscillated in the longitudinal direction of the lens portions is reflected at the highest reflectivity. If a panel using a P-polarized light component is used as liquid crystal panel 3G, and panels using S-polarized light components are respectively used as liquid crystal panels 3R and 3B, the oscillating direction of a green image beam transmitted through liquid crystal panel 3G becomes perpendicular to that of red and blue image beams transmitted through liquid crystal panels 3R and 3B. Therefore, if the lens portions of lenticular lens 13 on the surface of screen 12 are, for example, stripe lens portions aligned in a direction perpendicular to the oscillating direction of the red and blue image beams, the red and blue image beams are transmitted through the rear surface to the front surface of screen 12 at a high transmittance, but the green image beam which is oscillated in a direction parallel to the longitudinal direction of the lens portions is transmitted through screen 12 at a low transmittance because it has a high reflectivity at the lens portion surface. As a result, the poor color balance of the full-color image beam projected on screen 12 caused by projection unit 1 itself in FIG. 2, in which the saturation level of a green beam as low, is further degraded. In contrast to this, if the stripe lens portions of lenticular lens 13 are arranged in a direction perpendicular to the oscillating direction of a green image beam, a full-color image projected on screen 12 becomes an image in which the saturation levels of red and blue beams are low.

SUMMARY OF THE INVENTION

It is, therefore, an object of the present invention to provide a liquid crystal projector, in which the light applied from a light source is separated into three primary-color beams (i.e., red beam, green beam, and blue beam), and the three beams are transmitted through three liquid crystal panels and combined on a screen, through three paths which have substantially the same length, respectively, thereby forming on the screen a color image which has a good color balance.

To attain the above object, there is provided a liquid crystal projector comprising:
light source means;
first to third liquid crystal panels;
a projection lens; and
optical means for splitting light emitted from said light source means into three beams of primary colors, and guiding the three beams to said projection lens through said first to third liquid crystal panels, respectively, along three optical paths having substantially the same length.

BRIEF DESCRIPTION OF THE DRAWINGS

FIG. 5 is a longitudinal, sectional view illustrating a liquid crystal projector of rear-projection type, according to a second embodiment of the present invention;

FIG. 7 is a diagram illustrating the optical system incorporated in a liquid crystal projector according to a third embodiment of the invention;

FIG. 8 is a diagram explaining how the lenses used in the optical system shown in FIG. 7 function;

FIG. 12 is a diagram explaining how the light-transmitting member shown in FIG. 11 diffracts light;

FIG. 13 is a diagram showing another light-transmitting member which can be used in the projector shown in FIG. 11 in place of the light-transmitting member illustrated in FIG. 12;

FIGS. 18 and 19 are graphs illustrating the transmittance characteristics of the dichroic mirrors used in the sixth embodiment;

FIG. 21 is a plan view of the liquid crystal projector shown in FIG. 20;

FIG. 22 is a front view of the liquid crystal projector illustrated in FIG. 20;

FIG. 23 is a right-side view of the projector shown in FIG. 20;

FIGS. 24 and 25 are graphs representing the transmittance characteristics of the dichroic mirrors used in the seventh embodiment;

DETAILED DESCRIPTION OF THE PREFERRED EMBODIMENTS

First Embodiment

A first embodiment will be described below with reference to FIGS. 3 and 4.

Figure 3:
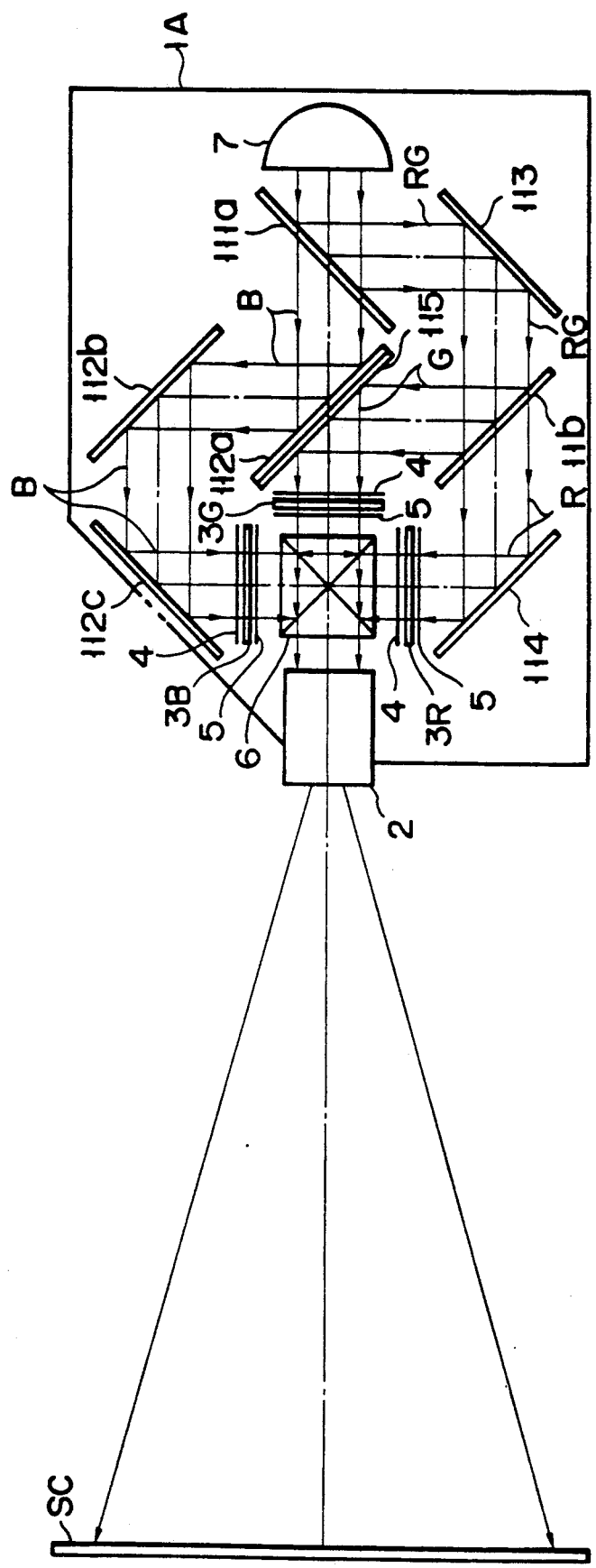
FIG. 3 is a longitudinal, sectional side view showing a projection-type liquid crystal projector according to a first embodiment of the present invention.

FIG. 3 shows an overall arrangement of a liquid crystal projector (projector). FIG. 4 is an enlarged view showing a projection system in the projector main body.

Figure 4:
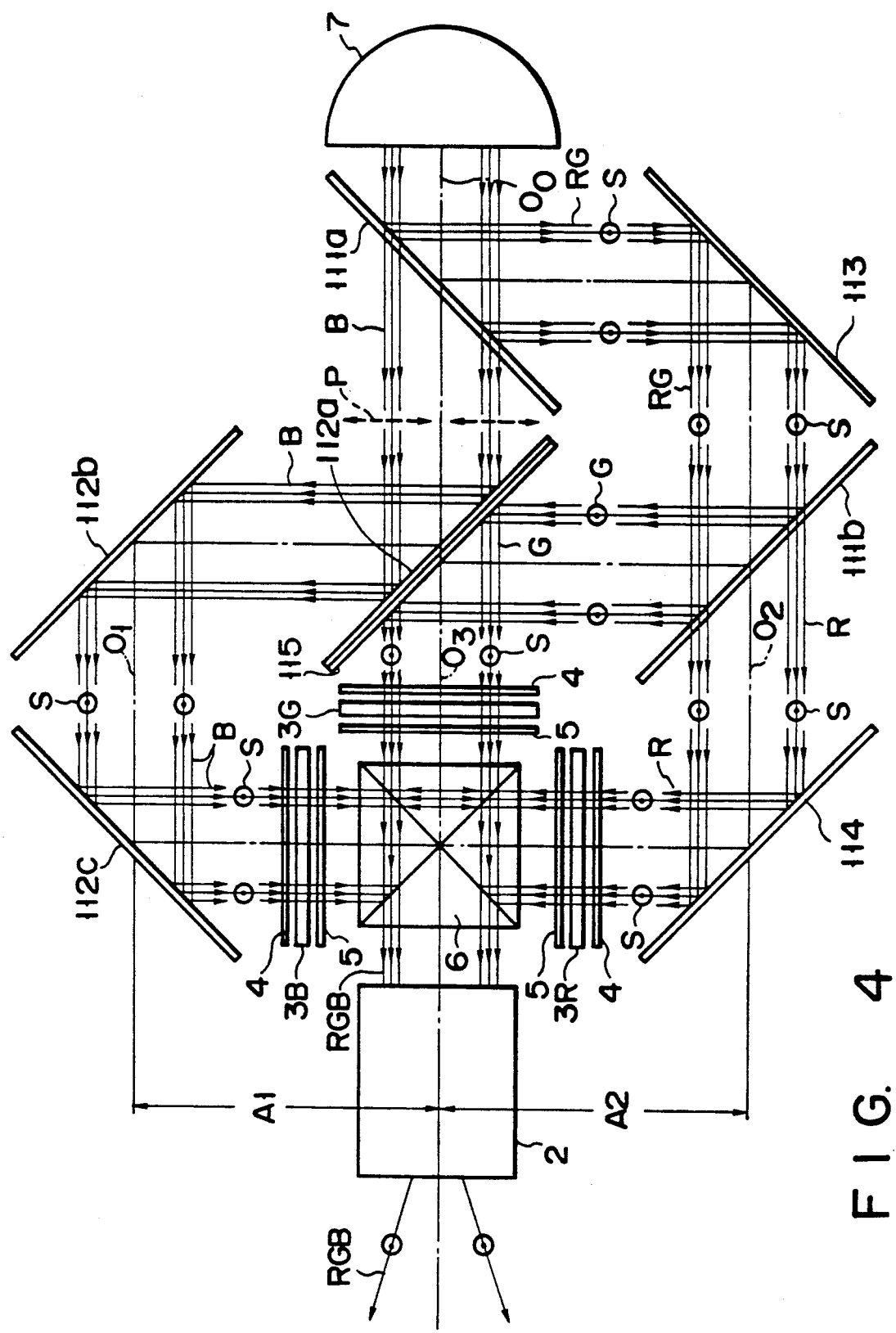
FIG. 4 is an enlarged view illustrating the projecting system incorporated in the liquid crystal projector shown in FIG. 3.

Referring to FIGS. 3 and 4, reference symbol 1A denotes a projection unit. Projection lens 2 is arranged at the front surface of unit 1A. Reference symbols 3R, 3G, and 3B denote three TN type liquid crystal panels each comprising incident light polarizing plate 4 arranged on its incident surface and image forming polarizing plate 5 arranged on its output surface. The liquid crystal in each TN type liquid crystal panel is twisted with respect to the polarization axis direction of polarizing plate 4. In liquid crystal panels 3R, 3G, and 3B, pixel arrangements and aligning directions of liquid crystals are the same. Liquid crystal panels 3R, 3G, and 3B respectively function as a red image display liquid crystal panel for displaying a red image, a green image display liquid crystal panel for displaying a green image, and a blue image display liquid crystal panel for displaying a blue image. Liquid crystal panels 3R, 3G, and 3B respectively display images of red, green, and blue color components constituting a single full-color image. One of liquid crystal panels 3R, 3G, and 3B, e.g., green image display liquid crystal panel 3G, is arranged such that its output surface opposes projection lens 2. The other two liquid crystal panels, i.e., red and blue image display liquid crystal panels 3R and 3B, are arranged at both side surfaces of dichroic prism 6, which is arranged between liquid crystal panel 3G and projection lens 2, such that the output surfaces of liquid crystal panels 3R and 3B oppose each other. In addition, liquid crystal panels 3R, 3G, and 3B are located at the same distance from the center of dichroic prism 6.

Reference numeral 7 denotes a light source for radiating beams onto liquid crystal panels 3R, 3G, and 3B, respectively. Light source 7 is located to oppose green image display liquid crystal panel 3G, which opposes projection lens 2, of liquid crystal panels 3R, 3G, and 3B. Light source 7 comprises a light source lamp and a parabolic mirror reflector for reflecting light from the light source lamp toward liquid crystal panel 3G as a parallel beam.

Reference symbols 111a and 111b denote two dichroic mirrors for separating light (white light) from light source 7 into three primary color (red, green, and blue) beams. First dichroic mirror 111a separates a blue beam. Blue beam separating dichroic mirror 111a is arranged between light source 7 and liquid crystal panel 3G so as to be tilted at 45° with respect to the optical axis (to be referred to as a light source optical axis hereinafter) of light radiated from light source 7. Dichroic mirror 111a transmits a beam having a blue color component wavelength and reflects beams having other color component wavelengths, i.e., beams having red and green color component wavelengths.

Of the light from light source 7, blue beam B transmitted through blue beam separating dichroic mirror 111a is reflected by first mirror 112a for reflecting a blue beam in a direction perpendicular to light source optical axis O0 (the optical axis of blue beam B transmitted through polarization axis direction mirror 111a). First mirror 112a is arranged between dichroic mirror 111a and liquid crystal panel 3G so as to be tilted at 45° with respect to light source optical axis O0 and to oppose dichroic mirror 111a at 90°. Second mirror 112b for reflecting a blue beam is arranged at a side of first mirror 112a so as to be parallel thereto. Blue beam B reflected by first mirror 112a is reflected by second mirror 112b in a direction parallel to light source optical axis O0. Blue beam B is further reflected by third mirror 112c for reflecting a blue beam toward blue image display liquid crystal panel 3B. Third mirror 112c is arranged to oppose the incident surface of liquid crystal panel 3B at a tilt angle of 45° and to oppose second mirror 112b at 90°.

Red/green beam RG reflected by blue beam separating dichroic mirror 111a is reflected by red/green beam reflecting mirror 113, which is arranged at the opposite side of second and third mirrors 112b and 112c so as to be opposite and parallel to dichroic mirror 111a, in a direction parallel to light source optical axis O0 and optical axis O1 of blue beam B reflected by second mirror 111b. Red/green beam RG is then incident on second dichroic mirror 111b which is arranged at 45° with respect to optical axis O1 and at 90° with respect to reflecting mirror 113. Second dichroic mirror 111b separates red/green beam RG reflected by dichroic mirror 111a into red and green beams R and G. Red/green beam separating dichroic mirror 111b transmits a beam having a red color component wavelength and reflects beams having other color component wavelength, i.e., a beam having a green color component wavelength.

Red beam R transmitted through dichroic mirror 111b is reflected by single red beam reflecting mirror 114 toward red image display liquid crystal panel 3R. Reflecting mirror 114 is arranged so as to oppose the incident surface of liquid crystal panel 3R at a tilt angle of 45° and to be parallel to dichroic mirror 111b. Green beam G reflected by dichroic mirror 111b is reflected by single green beam reflecting mirror 115 toward green image display liquid crystal panel 3G. Reflecting mirror 115 is arranged so as to oppose the incident surface of liquid crystal panel 3G at a tilt angle of 45° and to parallelly oppose dichroic mirror 111b.

In this embodiment, green beam reflecting mirror 115 is stacked on blue beam reflecting first mirror 112a back to back. However, reflecting mirror 115 and first mirror 112a may be formed into a single mirror using the two surfaces as reflecting surfaces. If both the mirrors are independently used, they may be set away from each other.

In addition, in this embodiment, reflection enhancing mirrors each having a reflecting surface with a reflection coating or dichroic mirrors are used as mirrors 112a, 112b, 112c, 113, 114, and 115. If the reflection enhancing mirrors are used, their reflectivities can be increased.

If the dichroic mirrors are used as mirrors 112a, 112b, 112c, 113, 114, and 115, each mirror can be designed to reflect a color beam with a slightly narrowed wavelength band and transmit beams having the other wavelength range. If the dichroic mirrors are used as the respective mirrors in this manner, red, green, and blue beams incident on liquid crystal panels 3a, 3G, and 3B can be made closer to the primary colors, respectively.

If reflecting mirror 115 and first mirror 112a, which are arranged back to back, are both dichroic mirrors, light absorbing layers for absorbing transmitted light must be formed on their rear surfaces (between mirrors 115 and 112a if mirrors 115 and 112a are attached to each other back to back).

Reflecting mirror 115 and dichroic mirror 111b are located to satisfy a positional relationship in which optical axis O3 of green beam G reflected by reflecting mirror 115 toward liquid crystal panel 3G coincides with light source optical axis O0. Second and third mirrors 112b and 112c, reflecting mirror 113, dichroic mirror 111b, and reflecting mirror 114 are located at the same distance from light source optical axis O0 so as to allow distance A1 from optical axis O1 of blue beam B reflected by second mirror 112b to optical axis O3 of green beam G reflected by reflecting mirror 115 and distance A2 from optical axis O2 of red beam R transmitted through dichroic mirror 111b to optical axis O3 of green beam G reflected by reflecting mirror 115 to satisfy a relation A1=A2.

Red beam reflecting mirror 114 and blue beam reflecting third mirror 112c are located such that the optical axes of red and blue beams R and B, which are respectively reflected by mirrors 114 and 112c and are transmitted through liquid crystal panels 3R and 3B so as to be incident on image mixing dichroic prism 6, coincide with optical axis O3 of green beam G, which is reflected by reflecting mirror 115 and is transmitted through liquid crystal panel 3G so as to be incident on dichroic prism 6, at the center of dichroic prism 6.

Liquid crystal panels 3R, 3G, and 3B are located at the same distance from the center of dichroic prism 6, as described above, and optical paths are formed so as to bend red, green, and blue beams R, G, and B at a right angle. With this arrangement, optical path lengths of red, green, and blue beams R, G, and B from light source 7 to red, green, and blue image display liquid crystal panels 3R, 3G, and 3B are the same.

In the light input system of liquid crystal panels 3R, 3G, and 3B described above, red beam R of the light from light source 7 is reflected by blue beam separating dichroic mirror 111a and red/green beam reflecting mirror 113 and is transmitted through red/green beam separating dichroic mirror 111b so as to be reflected by red beam reflecting mirror 114 and be incident on red image display liquid crystal panel 3R. Green beam G is 7 reflected by dichroic mirror 111a, reflecting mirror 113, dichroic mirror 111b, and reflecting mirror 115, and is incident on green image display liquid crystal panel 3G. Blue beam B is transmitted through dichroic mirror 111a and is reflected by three reflecting mirrors 112a, 112b, and 112c so as to be incident on blue image display liquid crystal panel 3B. Therefore, all the beams incident on liquid crystal panels 3R, 3G, and 3B have high-intensity S-polarized light components.

More specifically, in blue beam B, for example, its S-polarized light component is attenuated when light is transmitted through dichroic mirror 111a and blue beam B is separated, and hence blue beam B becomes a beam in which the intensity of a P-polarized light component in the P direction shown in FIG. 4 is high. However, since blue beam B is then reflected by three reflecting mirrors 112a, 112b, and 112c and is guided to liquid crystal panel 3B, blue beam B is incident on liquid crystal panel 3B with almost no attenuation of the S-polarized light component. Note that the P-polarized light component of blue beam B is attenuated every time blue beam B is reflected by reflecting mirrors 112a, 112b, and 112c. More specifically, the P-polarized light component of blue beam B is attenuated when blue beam B is reflected by first mirror 112a. As a result, the intensity of the P-polarized light component becomes substantially equal to that of the S-polarized light component. The P-polarized light component is attenuated twice when blue beam B is reflected by second and third mirrors 112b and 112c. That is, blue beam B incident on blue image display liquid crystal panel 3B is a beam which has been transmitted once and reflected three times. Therefore, blue beam B is a beam in which the S-polarized light component is attenuated only once and hence has a high intensity.

This description equally applies to red beam R which is incident on red image display liquid crystal panel 3R. Since red beam R is a beam which has been transmitted once and reflected three times, the S-polarized light component is attenuated only once. Hence, red beam R is a beam in which the intensity of the S-polarized light component is high.

Green beam G incident on green image display liquid crystal panel 3G is a beam which has been reflected four times without being transmitted through any mirror. Therefore, green beam G is a beam in which the S-polarized light component is subjected to almost no attenuation and hence has a high intensity.

In addition, in this light input system, the optical path lengths from light source 7 to liquid crystal panels 3R, 3G, and 3B are set to be equal. With this arrangement, even if light from light source 7 is not perfectly parallel light and diverges to a certain extent upon propagation, the respective color beams incident on liquid crystal panels 3R, 3G, and 3B have substantially the same width of scattering. Therefore, the red, green, and blue beams which are respectively incident on incident light polarizing plates 4 of liquid crystal panels 3R, 3G, and 3B have the same intensity. In liquid crystal panels 3R, 3G, and 3B, the polarization axis directions of polarizing plates 4 are respectively matched with the oscillating directions of the S-polarized light components of red, green, and blue beams R, G, and B. In addition, in each liquid crystal panel, a liquid crystal is twisted at about 90° or 270° with respect to the polarization axis direction of polarizing plate 4. In this case, image forming polarizing plate 5 is arranged in each liquid crystal panel such that the polarization axis direction of polarizing plate 5 is parallel to the polarization axis direction of polarizing plate 4.

That is, liquid crystal panels 3R, 3G, and 3B use S-polarized light components of incident beams as incident beams. As described above, red, green, and blue beams which are respectively incident on liquid crystal panels 3R, 3G, and 3B have high-intensity S-polarized light components and have substantially the same intensity. The beams having these S-polarized light components are respectively transmitted through polarizing plates 4 and are incident on liquid crystal panels 3R, 3G, and 3B. Therefore, beams having high intensities can be caused to be incident on all liquid crystal panels 3R, 3G, and 3B. As a result, all the red, green, and blue image beams which are obtained after the respective beams are transmitted through liquid crystal panels 3R, 3G, and 3B and image forming polarizing plates 5 become image beams having high luminances.

Note that the respective image beams remain the beams having the high-intensity S-polarized light components because the polarization axis directions of image forming polarizing plates 5 of liquid crystal panels 3R, 3G, and 3B are parallel to the polarization axis directions of corresponding incident light polarizing plates 4. The red, green, and blue image beams transmitted through liquid crystal panels 3R, 3G, and 3B and polarizing plates 5 are respectively incident on image mixing dichroic prism 6. Dichroic prism 6 mixes the respective image beams to form a single full-color image beam in which the primary color beams, i.e., red, green, and blue beams R, G, and B are superposed on each other. This full-color image beam is enlarged/projected on screen SC by projection lens 2.

In this case, of the red, green, and blue image beams (beams having the high-intensity S-polarized light components) which are incident on image forming dichroic prism 6, the red and blue image beams are refracted by dichroic prism 6. Hence, dichroic prism 6 outputs the red and blue image beams without substantially attenuating them as in the case wherein beams are reflected by the mirrors. In contrast to this, the green image beam propagating straight through dichroic prism 6 is attenuated as in the case wherein a beam is transmitted through the dichroic mirror. However, green beam G which is incident on green image display liquid crystal panel 3G is a beam which is reflected four times without being transmitted through. The S-polarized component of the green beam at the liquid crystal panel 3G is intensified more than those of the red and blue beams at liquid crystal panels 3R and 3B by the amount for one transmission. For this reason, the green image beam emerging from dichroic prism 6 is attenuated in dichroic prism 6 and becomes a beam having substantially the same intensity as the intensities of the red and blue image beams. Therefore, a full-color image beam mixed by dichroic prism 6 becomes an image beam having a good color balance in which the intensities of the red, green, and blue beams are substantially the same.

As described above, according to this projection type liquid crystal projector, light from single light source 7 is separated into the three primary color (red, green, and blue) beams. The respective color beams are incident on three TN type liquid crystal panels 3R, 3G, and 3B. The red, green, and blue beams transmitted through liquid crystal panels 3R, 3G, and 3B are superposed on each other to form a full-color image beam. This full-color image beam is projected on screen SC by projection lens 2. In spite of the above-described arrangement, in this projection type liquid crystal projector, identical liquid crystal panels can be used as three TN type liquid crystal panels 3R, 3G, and 3B, and moreover, a high-quality full-color image beam in which the intensities of red, green, and blue beams are balanced can be projected on screen SC.

In the above-described embodiment, image forming polarizing plates 5 are respectively arranged on the output surfaces of liquid crystal panels 3R, 3G, and 3B. However, only one image forming polarizing plate 5 may be arranged on the output surface of dichroic prism 6 so as to be commonly used to form beams transmitted through liquid crystal panels 3R, 3G, and 3B into image beams. In addition, polarizing plates 5 may be arranged such that their polarization axis directions are substantially perpendicular to those of incident light polarizing plates 4 of liquid crystal panels 3R, 3G, and 3B, respectively. However, if the polarization axis directions of image forming polarizing plates 5 are set to be substantially perpendicular to those of incident light polarizing plates 4, the oscillating directions of beams which are respectively transmitted through polarizing plates 4 and are incident on liquid crystal panels 3R, 3G, and 3B are shifted from those of the image beams which are transmitted through polarizing plates 5 by about 90°. Even in this case, if the respective color beam separated by dichroic mirrors 111a and 111b are caused to be incident on liquid crystal panels 3R, 3G, and 3B by the respective mirrors through the optical paths having substantially the same length as beams in which the intensities of polarized light components in the same direction are high, a high-quality full-color image in which the intensities of red, green, and blue beams are balanced can be projected on screen SC, as in the above embodiment.

Furthermore, in the above embodiment, green image display liquid crystal panel 3G is located to oppose protection lens 2 through dichroic prism 6, and red and blue image display liquid crystal panels 3R and 3B are arranged at both the sides of dichroic prism 6. However, the arrangement of liquid crystal panels 3R, 3G, and 3B is not limited to the one described in the above embodiment. Furthermore, in the above embodiment, the projection type liquid crystal projector for projecting/displaying a full-color image on external screen SC is described. However, the present invention can also be applied to a rear-projection type liquid crystal protector in which a transmission type screen is arranged on the front surface of the protector main body and a full-color image is projected on the screen from its rear surface side (the inside of the projector main body) so that the full-color image projected on the transmission type screen can be viewed from the front surface side of the projector main body.

Since the projection type liquid crystal projector according to the first embodiment of the present invention has the above-described arrangement, in spite of the arrangement wherein light from a single light source is separated into the three primary color (red, green and blue) beams, a full-color image beam is formed by superposing the red, green, and blue beams which are respectively incident on three TN type liquid crystal panels and are transmitted therethrough, and this full-color image beam is projected on a screen by a projection lens, identical liquid crystal panels can be used as all the three TN type liquid crystal panels, and moreover, a high-quality full-color image beam in which the intensities of red, green, and blue beams are balanced can be projected on the screen.

Second Embodiment

A rear-projection type liquid crystal projector having first and second characteristic features according to a second embodiment of the present invention will be described below with reference to FIGS. 5 and 6.

FIG. 5 shows an overall arrangement of the rear-projection type liquid crystal projector. FIG. 6 is a partial enlarged sectional view taken along line A—A in FIG. 5.

Figure 1:
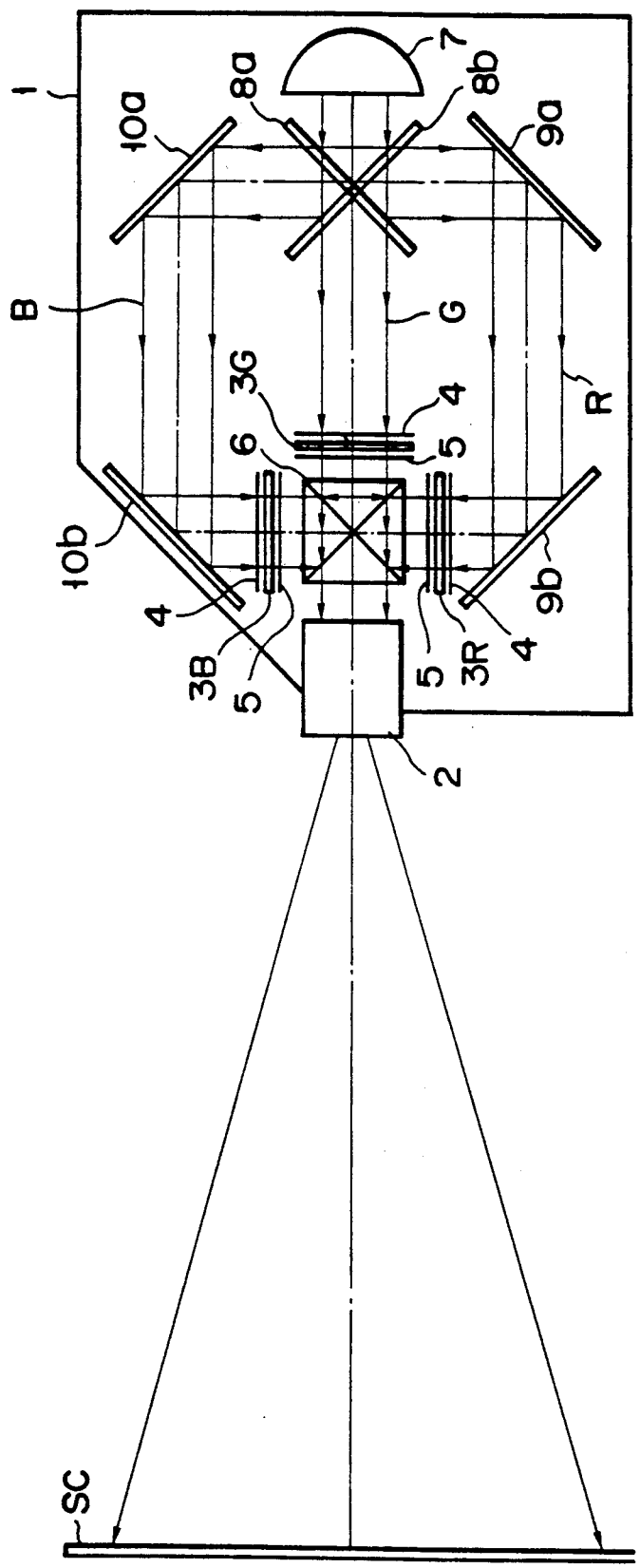
FIG. 1 is a longitudinal, sectional view illustrating a conventional liquid crystal projector of projection type.
Figure 2:
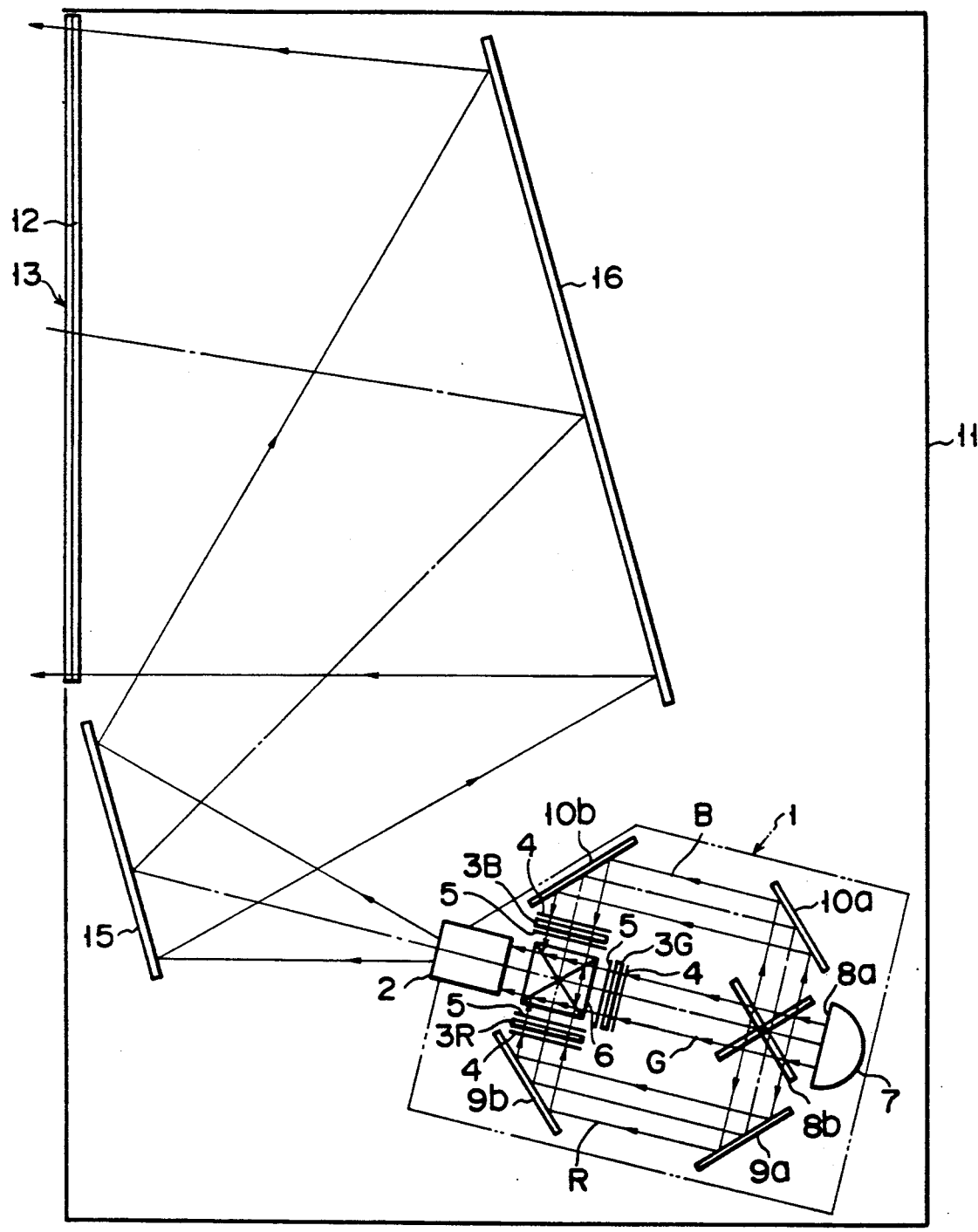
FIG. 2 is a longitudinal, sectional view showing a conventional liquid crystal projector of rear-projection type.
Figure 6:
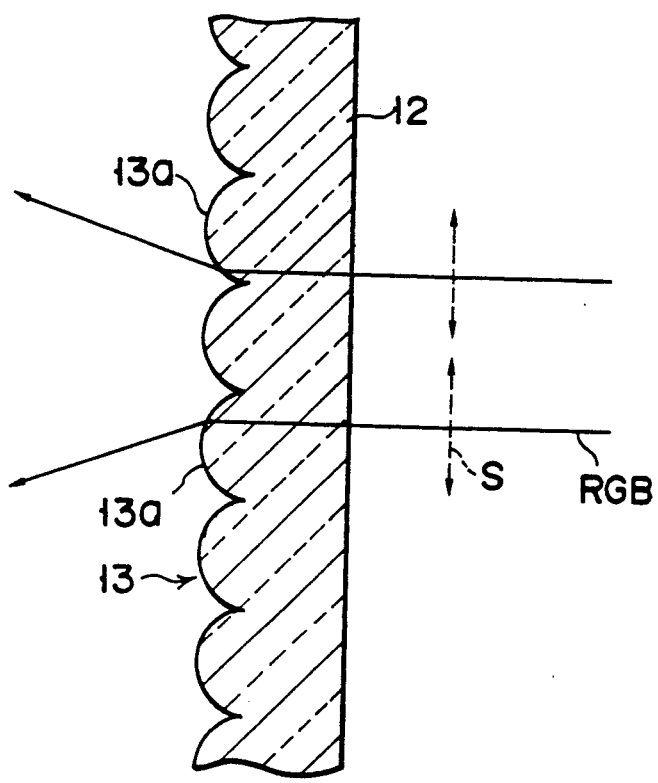
FIG. 6 is an enlarged sectional view, taken along line A—A in FIG. 5.

Referring to FIGS. 5 and 6, reference numeral 11 denotes a case of the projector. Transmission type screen 12 having lenticular lens 13 formed on its surface is arranged on a display window formed in the front surface of case 11. Lenticular lens 13 comprises a plurality of stripe lens portions each having a small width. Reference symbol 1A denotes a protection unit equivalent to the protection unit in FIG. 1, which is housed in case 11. Reference numerals 15 and 16 denote projection mirrors. A projection beam (full-color image beam) from protection unit 1A is reflected by first projection mirror 15 toward second projection mirror 16, and is further reflected by second projection mirror 16 toward screen 12 in the same manner as in the conventional rear-projection type liquid crystal display projector shown in FIG. 1.

Note that the optical lengths from light source 7 to liquid crystal panels 3R, 3G, and 3B are set to be substantially the same in projection unit 1A as described above in order to equalize the intensities of red, green, and blue beams. More specifically, if perfectly parallel light is emitted from light source 7, the red, green, and blue beams which are respectively incident on liquid crystal panels 3R, 3G, and 3B have the same intensities as those at the time when the beams are separated by dichroic mirrors 111a and 111b. In practice, however, even if a parabolic mirror reflector is used as light source 7, light from light source 7 is not perfectly parallel light but diverges upon propagation. Hence, the width of a beam is increased as an optical path from light source 7 is elongated. Therefore, if the optical path lengths from light source 7 to liquid crystal panels 3R, 3G, and 3B differ from each other as in the conventional rear-projection type liquid crystal projector, red and blue beams R and G which are respectively incident on red and blue image display liquid crystal panels 3R and 3B having long optical path lengths from light source 7 are increased in beam width compared with green beam G which is incident on green image display liquid crystal panel 3G having a short optical path length from light source 7. As a result, the illuminances per unit area of the beams which are respectively incident on liquid crystal panels 3R and 3B are decreased. This is one of the causes for decreasing the intensities of beams which are respectively incident on liquid crystal panels 3R and 3B. In contrast to this, according to the present invention, since the optical path lengths from light source 7 to liquid crystal panels 3R, 3G, and 3B are set to be equal, the beam widths of the red, green, and blue which are respectively incident on liquid crystal panels 3R, 3G, and 3B are increased to the same extent. Therefore, beams having the same intensity can be incident on liquid crystal panels 3R, 3G, and 3B.

That is to say, the first characteristic feature of this projector will be described below. Projection mirrors 15 and 16 for guiding a full-color image beam protected by protection lens 2 from projection unit 1A toward transmission tape screen 12 arranged on the front surface of case 11 are respectively arranged in case 11 so as to be tilted in a direction perpendicular to the oscillating direction of the full-color image beam (S-polarized beam) transmitted through projection lens 2. This is that projection mirrors 15 and 16 are set at the tilt direction described above so as to efficient reflect a full-color image beam and to reflect S-polarized beams oscillating in a direction perpendicular to the tilt direction at high reflectivities. If all red, green, and blue beams R, G, and B of the full-color image beam transmitted through projection lens 2 are S-polarized beams, and projection mirrors 15 and 16 are tilted in the above-described manner, all red, green, and blue beams R, G, and B of the full-color image beam are reflected by projection mirrors 15 and 16 in the original oscillating direction without being attenuated. As a result, the full-color image beam which is transmitted through projection lens 2 can be protected on screen 12 as an enlarged full-color image having a good color balance in which the red, green, and blue beams have substantially the same intensity.

The second characteristic feature of this protector will be described below. Lenticular lens 13 formed on the surface of transmission type screen 12 on the front surface of case 11 diffuses an image beam, which is projected on screen 12 from its rear surface side and emerges from its front surface side, so as to expand the viewing angle of an image projected on the screen. As shown in FIGS. 3 and 4, lenticular lens 13 on the screen surface consists of stripe lens portions 13a each having a small width. Lens portions 13a are formed on the screen surface in a direction (vertical in this embodiment) perpendicular to the oscillating direction of an image beam which is transmitted through projection lens 2 and is reflected by protection mirrors 15 and 16 so as to be projected on screen 12. With this arrangement, reflection of an image beam on the surface of lenticular lens 13 can be decreased. The reflectivity of a beam incident on screen 12 becomes minimum at the surface of each lens portion 13a when the beam is a beam oscillating in the widthwise direction (the curved direction of the lens-like surface) of lens portion 13a. Therefore, if lens portions 13a of lenticular lens 13 are formed in the direction perpendicular to the oscillating direction of an image beam reflected by protection mirrors 15 and 16 as described above, the image beam reflected by projection mirrors 15 and 16, i.e., the S-polarized beam, is incident on screen 12 as a beam oscillating in the widthwise direction of each lens portion 13a with respect to lenticular lens 13 on the screen surface, as shown in FIG. 4. Since all red, green, and blue beams R, G, and B of the full-color image beam incident on screen 12 are beams oscillating in the same directions (S-polarized beams), all red, green, and blue beams R, G, and B are transmitted through screen 12 to its front surface side substantially without reflection at the surface of lenticular lens 13. Hence, the resultant full-color image viewed from the front surface side of the projector is an image having a good color balance and a high luminance.

According to the first characteristic feature of this rear-projection type liquid crystal protector, therefore, in spite of the arrangement wherein light from single light source 7 is separated into the three primary color (red, green, and blue) beams and the color beams are respectively caused to be incident on three TN type liquid crystal panels 3R, 3G, and 3B so as to form a full-color image beam by superposing the red, green, and blue beams transmitted through liquid crystal panels 3R, 3G, 3B, so that the full-color image beam is protected on transmission type screen 12 on the front surface of the case by projection lens 2 through protection mirrors 15 and 16, a high-quality image in which the intensities of red, green, and blue beams are balanced can be projected on screen 12.

In the above embodiment, red and blue beams R and B are caused to be incident on red and blue image display liquid crystal panels 3R and 3B after they are reflected three times, whereas green beam G is caused to be incident on green image display liquid crystal panel 3G after it is reflected four times. However, the number of reflection can be arbitrarily set as long as mirrors are arranged to oppose the incident surfaces of liquid crystal panels 3R, 3G, and 3B so as to cause the color beams, which are separated by dichroic mirrors 111a and 111b, to be respectively incident on the corresponding liquid crystal panels is beams in which light components polarized in the same direction have high intensities.

Since the first characteristic feature of the rear-projection type liquid crystal projector according to the second embodiment has the above-described arrangement, in spite of the arrangement wherein light from a single light source is separated into the three primary color (red, green, and blue) beams and the color beams are respectively caused to be incident on three TN type liquid crystal panels so as to form a full-color image beam by superposing the red, green, and blue beams transmitted through liquid crystal panels, so that the full-color image beam is protected on a transmission type screen on the front surface of a case by a projection lens through protection mirrors, a high-quality image in which the intensities of red, green, and blue beams are balanced can be protected on the screen.

According to the second characteristic feature of the rear-projection type liquid crystal protector, in spite of the arrangement wherein light from single light source 7 is separated into the three primary color (red, green, and blue) beams and the color beams are respectively caused to be incident on three Tn type liquid crystal panels 3R, 3G, and 3B so as to form a full-color image beam by superposing the red, green, and blue beams which are transmitted through liquid crystal panels 3R, 3G, and 3B, so that the full-color image beam is projected by protection lens 2 on transmission type screen 12 having lenticular lens 13 formed on its surface, the full-color image beam which is transmitted through screen 12 to its front surface side and viewed therefrom can be a high-quality image in which the intensities of red, green, and blue beams are balanced.

In the above embodiment, image forming polarizing plates 5 are respectively arranged on the incident surfaces of liquid crystal panels 3R, 3G, and 3B. However, only one image forming polarizing plate 5 may be arranged on the output surface of dichroic prism 6 so that polarizing plate 5 can be commonly used to form beams, which are respectively transmitted through liquid crystal panels 3R, 3G, and 3B, into image beams. In addition, polarizing plates 5 may be arranged such that their polarization axis directions are set to be substantially perpendicular to the polarization axis directions of incident light polarizing plates 4 of liquid crystal panels 3R, 3G, and 3B. Note that if the polarization axis directions of polarizing plates 5 are set to be substantially perpendicular to the polarization axis directions of polarizing plates 4, the oscillating directions of beams which are respectively transmitted through polarizing plates 4 and incident on liquid crystal panels 3R, 3G, and 3B are shifted from those of the image beams which are transmitted through polarizing plates 5 by about 90°. Even in this case, if the color beams separated by dichroic mirrors 16a and 16b are respectively caused to be incident on liquid crystal panels 3R, 3G, and 3B as beams in which the intensities of polarized light components in the same direction are high, and the longitudinal direction of lens portions 13a of lenticular lens 13 on the screen surface are set to be perpendicular to the oscillating direction of a full-color image beam transmitted through protection lens 2 (the oscillating direction of image beams transmitted through image forming polarizing plate 5), the full-color image transmitted through screen 12 to its front surface side can be a high-quality image in which the intensities of red, green, and blue beams are balanced. Furthermore, in the above embodiment, the rear-projection type liquid crystal protector employing a system of projecting an image beam transmitted through protection lens 2 on screen 12 through protection mirrors 15 and 16 is described. However, the present invention can be applied to a rear-projection type liquid crystal protector employing a system wherein a protection lens is arranged to be directly opposite to a transmission type screen, and directly enlarging/projecting a full-color image transmitted through the protection lens on a screen.

Since the second characteristic feature of the rear-projection type liquid crystal projector according to the second embodiment of the present invention has the above-described arrangement, in spite of the arrangement wherein light from single light source 7 is separated into the three primary color (red, green, and blue) beams and the color beams are respectively caused to be incident on three TN type liquid crystal panels 3R, 3G, and 3B so as to form a full-color image beam by superposing the red, green, and blue beams which are transmitted through liquid crystal panels 3R, 3G, and 3B, so that the full-color image beam is protected by projection lens 2 on transmission type screen 12 having lenticular lens 13 formed on its surface, the full-color image which is transmitted through screen 12 to its front surface side and viewed therefrom can be made a high-quality image in which the intensities of red, green, and blue beams are balanced.

Third Embodiment

A third embodiment of the invention, which is also a liquid crystal projector, will now be described, with reference to FIGS. 7 and 8.

FIG. 7 illustrates the optical system incorporated in the liquid crystal projector. The optical system comprises a light source 201, a parabolic mirror 202, two dichroic mirrors 203 and 204, three total-reflection mirror 205, 206, and 207, three liquid crystal (LC) panels 208, 209, and 210 for displaying blue, green and red images, respectively, a dichroic prism 211, a lens 212, and a lens unit 213. The light emitted from the light source 201 is reflected by the parabolic mirror 202 and applied to the dichroic mirror 203. The dichroic mirror 203 separates the blue beam from the light, and reflects the light to the dichroic mirror 204. The dichroic mirror 204 separates the green beam from the light, and applies the light to the total-reflection mirror 206. The blue beam is reflected by the total-reflection mirror 205 and applied to the blue-image display LC panel 208.

The green beam is applied from the dichroic mirror 204 to the green-image display LC panel 209. The red beam is applied to the total-reflection mirror 206 through the dichroic mirrors 203 and 204, then from the mirror 206 to the total-reflection mirror 207, and finally to the red-image display LC panel 210. The optical path between the light source 201 and the blue-image display panel 208 and that between the light source 201 and the green-image display panel 209 have the same length. The optical path between the light source 201 to the red-image display panel 210 is longer. This is why the lens unit 213 is located in the path of the red beam. The lens unit 213 is a telescope system designed to adjust the luminance distribution of the LC panel 210 to the same value as those of the blue-image display LC panel 208 and the green-image display LC panel 209. The unit 213 comprises two convex lenses 213a and 213b. The first lens 213a is located between the dichroic mirror 204 and the total-reflection mirror 206. The mirror 204 allows the passage of a red beam, and the mirror 206 reflects the red beam. The second lens 213b is located between the total-reflection mirrors 206 and 207.

FIG. 8 is a diagram illustrating the lens unit 213 in detail, and also explaining the function of the unit 213. The lenses 213a and 213b have the same focal length f. The rear focal point F of the first lens 213a coincides with the front focal point of the second lens 213b. The first lens 213a is located on the virtual surfaces P of the LC panels 208 and 209. The second lens 213b is located at the distance of 2 f from the surface of the red-image display LC panel 210. The virtual surfaces P of the LC panels 208 and 209 are, therefore, the object planes of the lens unit 213, and the surface of the LC panel 210 is the image plane of the lens unit 213. The lens unit 213 therefore has a magnification of −1, and serves as a field lens, applying beams to the virtual surfaces P of the LC panels 208 and 209 and the surface of the LC panel 210 in the same direction.

The blue-image display LC panel 208 and the green-image display LC panel 209 are at the same distance from the light source 201.

Therefore, of the beams emitted from the light source 201, the blue beam applied to the LC panel 208 via the dichroic mirror 203 and the total-reflection mirror 205, and the green beam applied to the LC panel 209 via the dichoric mirror 203 and the dichroic mirror 204 have the same luminance distribution on the LC panels 208 and 209. Also, the red beam applied to the LC panel 210 via the dichroic mirrors 203 and 204, the lens unit 213 and the total-reflection mirrors 206 and 207 has the same luminance distribution. This is because the lens unit 213 reduces the virtual length of the path of the red beam, which extends from the light source 201 to the LC panel 210, such that the path of the red beam has the same virtual length as those of the blue and the green beams, which extend from the light source 201 to the LC panel 208, and from the light source 201 to the LC panel 209, and are actually shorter than the path of the red beam. More specifically, the first lens 213a which is located between the dichroic mirror 204 and the total-reflection mirror 206, is placed in the virtual surfaces of the LC panels 208 and 209, whereas the second lens 213b, which is located between the total-reflection mirrors 206 and 207, is at the distance of 2 f from the surface of the red-image display LC panel 210. In addition, the read focal point F of the first lens 213a and the front focal point F of the second lens 213b coincide on the reflecting surface of the mirror 206. Therefore, the lens unit 213 has a magnification of −1, and the beams are applied to the virtual surfaces P of the LC panels 208 and 209 and the surface of the LC panel 210 in the same direction. This is why the red beam has the same luminance distribution on the red-image display LC panel 210, as the blue and green beams have on the LC panels 208 and 209, though the red beam has been applied from the light source 210 through a longer path than the blue beam and the green beam. Hence, the blue, green, and red images of the object, which are displayed on the LC panels 208, 209, and 210, respectively, can be combined by means of the dichroic prism 211, without color distortion or nonuniformity of luminance. The combined color image is projected onto a screen through a projection lens 212, and displayed clear and enlarged.

Fourth Embodiment

A fourth embodiment of the invention, which is also a liquid crystal projector, will now be described, with reference to FIGS. 9 and 10.

Figure 9:
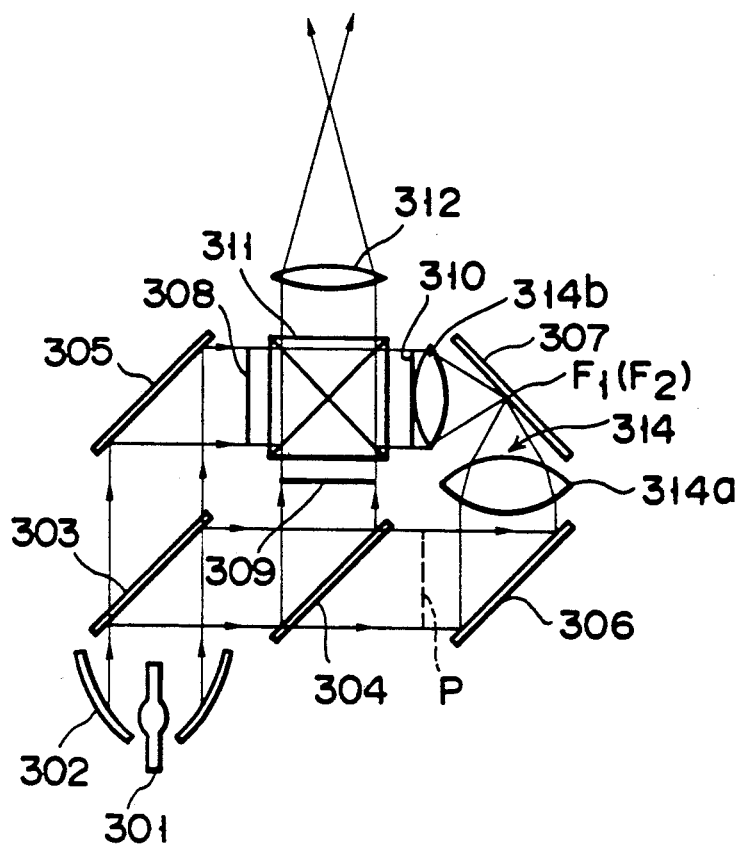
FIG. 9 is a diagram illustrating the optical system built in a liquid crystal projector according to a fourth embodiment of the invention.
Figure 10:
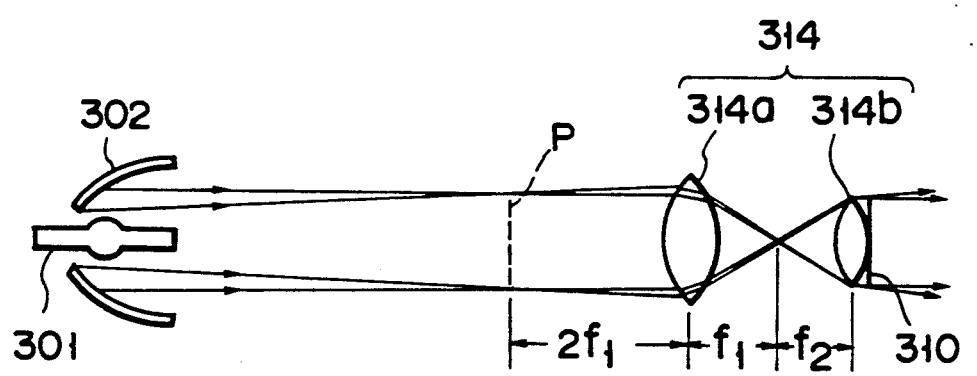
FIG. 10 is a diagram explaining how the lenses used in the optical system shown in FIG. 9 function.

As can be understood from FIGS. 9 and 10, the fourth embodiment is different from the third embodiment shown in FIGS. 7 and 8, in that a lens unit 314 is located at a different position. Like the lens unit 213 incorporated in the third embodiment, the lens unit 314 adjusts the luminance distribution of a red beam, and comprises two convex lenses 314a and 314b and a total-reflection mirror 307. The first lens 314a is located between a total-reflection mirrors 306 and 307 which are equivalent to the mirrors 206 and 207 used in the third embodiment. The second lens 314b is located between the total-reflection mirror 307 and a red-image display LC panel 310 which is equivalent to the LC panel 210 incorporated in the third embodiment. As is evident from FIG. 10, the first lens 314a is at the distance of $f_1$ ($f_1$ being the focal distance of the lens 314a) from the virtual surfaces P of a blue-image display LC panel 308 and a green-image display panel 309, which correspond to the LC panels 208 and 209 used in the third embodiment. The focal point $F_1$ of the first lens 314a is on the reflection surface of the mirror 307. The second lens 314b is located near the red-image display LC panel 310, at the distance of $f_2$ ($f_2$ being the focal distance of the lens 314b) from the total-reflection mirror 307. The focal point $F_2$ of the first lens 314b coincides with the focal point $F_1$ of the first lens 314, on the reflection surface of the mirror 307.

As is shown in FIG. 9, the blue-image display LC panel 308 and the green-image display LC panel 309 are at the same distance from the light source 301. Therefore, of the beams emitted from the light source 310, the blue beam applied to the LC panel 308 after passing through a dichoric mirror 303 and reflected by a total-reflection mirror 305, and the green beam applied to the LC panel 309 after passing through a dichroic mirror 303 and reflected by the dichroic mirror 304 have the same luminance distribution on the LC panels 308 and 309. Also, the red beam applied to the LC panel 31 after having been reflected by the dichroic mirrors 303 and 304 and the total-reflection mirror 306 and having passed through the lens unit 314 has the same luminance distribution. This is because the lens unit 313 reduces the virtual length of the path of the red beam, which extends from the light source 301 to the LC panel 310, such that the path of the red beam has the same length as those of the blue beam and the green beams, which extend from the light source 301 to the LC panel 308, and from the light source 301 to the LC panel 309.

Hence, the blue, green, and red images of the object, which are displayed on the LC panels 308, 309, and 310, respectively, can be combined by means of a dichroic prism 311, without color distortion or nonuniformity of luminance. The combined color image is projected onto a screen via a projection lens 312, and displayed clear and enlarged.

In the third and fourth embodiments, the lenses of the lens unit (213, 314) can be Fresnel lenses. When these are Fresnel lenses, it is desirable that they be positioned such that none of their fringes appear on the red-image displaying LC panel.

In the third and fourth embodiments, the light applied via the lens unit to the red-image display LC panel propagates in the direction opposite to the light applied to the blue-image display LC panel, and at right angles to the light applied to the green-image display LC panel. Nonetheless, the luminance distributions on the red-image display LC panel is the same as those on the blue-image and green-image display LC panels, because of the three display LC panels are symmetrical with respect to a point.

Further, in the third and fourth embodiments, the lens unit is located in the optical path extending between the light source and the red-image display LC panel. Alternatively, the lens unit can be provided either in the optical path extending between the light source and the blue-image display panel or in the optical path extending between the light source and the green-image display LC panel, provided either of the last-mentioned two optical paths is longer than the optical path extending between the light source and the LC panel used as reference chart.

The third and fourth embodiments are liquid crystal projectors of the type in which LC panels are used as charts. Nonetheless, the present invention can apply also to other types of image projectors in which sheets of film are used as charts.

As has been explained in detail, in the third and fourth embodiments of the invention, at least one of the charts is used as a reference chart, and an optical system is interposed in the optical path extending between the light source and another chart, which is longer than the optical path extending between the light source and the reference chart. This optical system adjusts the luminance distribution on the other chart such that the luminance distributions on all charts are of the same value. Hence, the color image, which is a combination of the images of different colors formed on the charts, is sufficiently clear.

Fifth Embodiment

A fourth embodiment of the invention, which is also a liquid crystal projector, will now be described, with reference to FIGS. 11 and 12.

Figure 11:
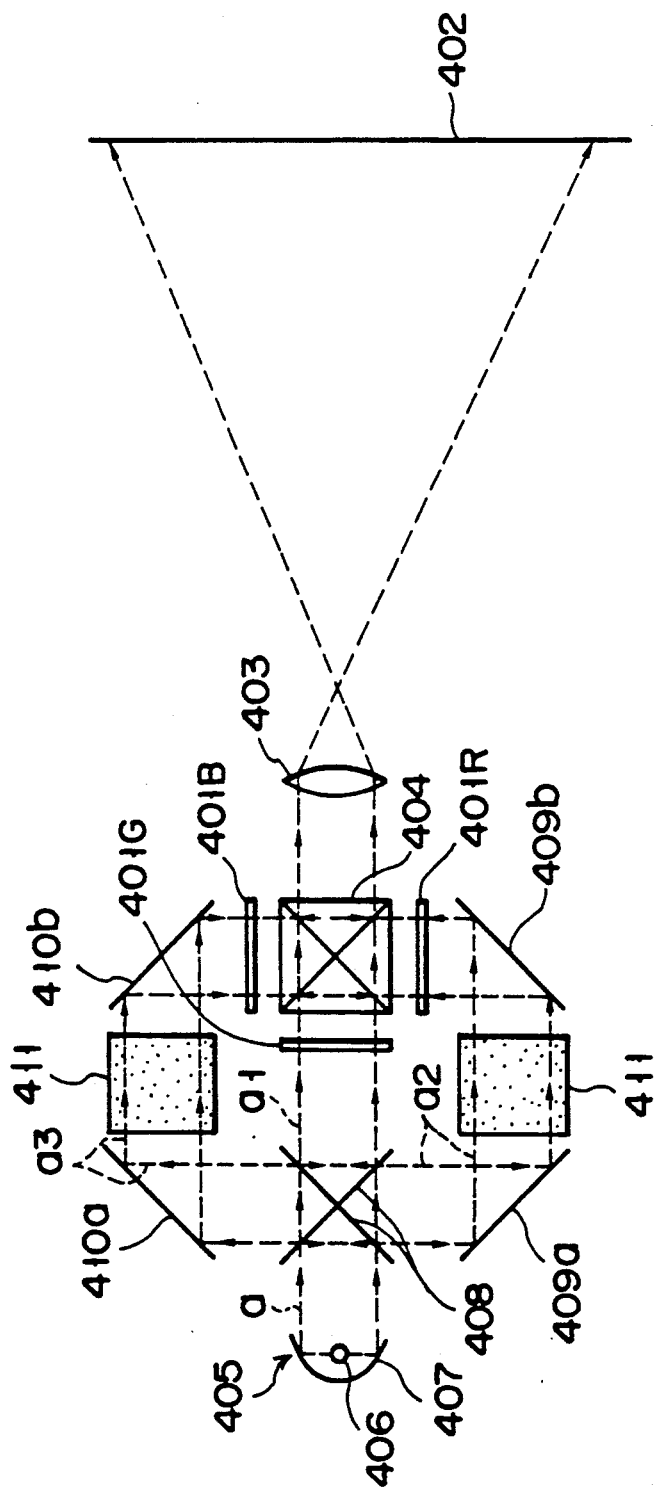
FIG. 11 is a plan view illustrating a liquid crystal projector according to a fifth embodiment of the invention.

As can be understood from FIG. 11, the fifth embodiment is characterized by the use of two light-transmitting members 411. Either light-transmitting member is a cube or a plate made of transparent material such as glass or acrylic resin, and has a light-receiving surface and a light-emitting surface, both perpendicular to the beam passing through the light-transmitting member.

Also in the liquid crystal projector shown in FIG. 11, the light from the light source 405 is split into three beams, i.e., a green beam a1, a red beam a2, and a blue beam a3, by means of the dichroic mirrors 408. The beams a1, a2 and a3 are applied to a green-image display LC panel 401G, a red-image display LC panel 401R, and a blue-image display LC panel 401B, along three different optical paths. The optical paths of the red beam a2 and the blue beam a3 are longer than the optical path of the green beam a1.

The green beam a1 passes through the dichroic mirrors 408 and applied to the green-image display LC panel 401G. The red beam a2 is applied from one of the dichroic mirrors 408, is reflected by a total-reflection mirror 409a, passes through the first light-transmitting member 411, is reflected by a total-reflection mirror 409b, and is applied to the red-image display LC panel 401R. The green beam a3 is applied from the other of the dichroic mirrors 408, is reflected by a total-reflection mirror 410a, passes through the second light-transmitting member 411, is reflected by a total-reflection mirror 410b, and is applied to the blue-image display LC panel 401B.

The members 411 diffract the incident beams such that the red beam a2 and the blue beam a3 have substantially the same diameter as the green beam a1, on the image-displaying surfaces of the LC panels 401R and 401B. More specifically, as is illustrated in FIG. 12, the red beam a2, for example, diverts as it travels from the light-source point O to the light-receiving surface of the light-transmitting member 411. In the member 411, the diversion of the red beam a2 is reduced as is indicated in FIG. 12 by the broken lines, since the member 411 has a refractive index n which is less than the refractive index n' of air. As a result of this, the red beam a2 output from the member 411 diverges as if the beam a2 has been supplied from a virtual light-source point O'. The virtual light-source point O' is at the distance L from the real light-source point O. This means that, in theory, the optical path of the red beam a2 is shortened by the distance L. $L=(1-n'/n)d$. Hence, the distance L is determined by the width d of the light-transmitting member 411, as measured in the direction in which the red beam a2 passes through the member 411. The member 411 has such a width d that the distance L is equal to the difference between the length of the optical path of the green beam a1 and the length of the optical path of the red beam a2. The red beam a2 has, therefore, substantially the same diameter as the green beam, as it is applied onto the red-image display LC panel 401R. Since the light-receiving surface and light-emitting surface of the member 411 are perpendicular to the beam passing through the member 411, the beam emerging from the member 411 is coaxial with the optical path extending to the red-image display LC panel 401R. Hence, the luminance distribution of the red beam on the light-receiving surface of the LC panel 401R is substantially identical to that of the green beam on the light-receiving surface of the green-image display LC panel 401G.

Also, the light-transmitting member 411, located in the optical path of the blue beams a3, has such a width d that the distance L is equal to the difference between the length of the optical path of the green beam a1 and the length of the optical path of the red beam a3. The blue beam a3 has, therefore, substantially the same diameter as the green beam, as it is applied onto the red-image display LC panel 401B. Hence, the luminance distribution of the blue beam on the light-receiving surface of the LC panel 401B is substantially identical to that of the green beam on the light-receiving surface of the green-image display LC panel 401G.

As has been explained, the red beam a2 and the blue beam a3 are distributed on the red-image display LC panel 401R and the blue-image display LC panel 401B, to substantially the same degree as the green beam a1 is distributed on the green-image display LC panel 401G, despite that the paths of the red beam a2 and the blue beam a3 are longer than that of the green beam a1. Therefore, the red image, the blue image, and the green image, which are displayed on the LC panels 401R, 401B, and 401G, respectively, have substantially the same luminance. Since these images have the same luminance, the color image formed by combining these images by means of a dichroic prism 404 is excellent in color balance. The color image is magnified and projected by a projection lens 403 onto a screen 402. The color image, thus projected on the screen 402, is sufficiently bright since the red image and the blue image have as high a luminance as that of the green image although the red beam a2 and the blue beam a3 have traveled longer from the light source 405 to the LC panels 401R and 401B than the green beam a1.

In the fifth embodiment, the first light-transmitting member 411 is located between the mirrors 409a and 409b, and the second light-transmitting member 411 is located between the mirrors 410a and 410b. Alternatively, either light-transmitting member can be mounted on the reflection surface of the mirror, as is illustrated in FIG. 13. In this case, the sum of the widths d1 and d2 of the light-receiving and light-emitting surfaces of the member 411 is equal to the width d defined by the above equation.

The light source 405 opposes the green-image display LC panel 401G in the fifth embodiment. Instead, the light source 405 can be positioned to oppose either the red-image display LC panel 401R or the blue-image display LC panel 401B. If this is the case, it suffices to locate a beam splitter (e.g., a dichoric mirror) between the light source 405 and the LC panel 401R or 401B, and to set two light-transmitting members in two beam paths extending from the beam splitter and the other image display LC panels.

Furthermore, three projection lenses can be used, instead of only one projection lens 403 which combines the red image, the blue image, and the green image displayed by the LC panels 401R, 401B, and 401G, thereby projecting a color image onto the screen 402. If three projection lenses are used, they magnify and project the red, blue, and green images onto the screen 402, whereby the three images are combined on the screen 402 into a color image. Hence, the present invention can apply to a so-called "three-lens LC projector."

As has been described, in the fifth embodiment, the beam emitted from the single light source 405 is split into three beams, i.e., the green beam a1, the red beam a2, and the green beam a3, which are applied to the green-image display LC panel 401G, the red-image display LC panel 401R, and the blue-image display LC panel 401B, through the optical paths having different lengths. Nonetheless, the three beams a1, a2, and a3 are distributed on the respective LC panels 401G, 401R, and 401B to the same degree, thereby forming a green image, a red image, and a blue image which have the same luminance. The color image formed on the screen 402 by combining these images of the same luminance has a sufficient color balance.

Sixth Embodiment

Figure 14:
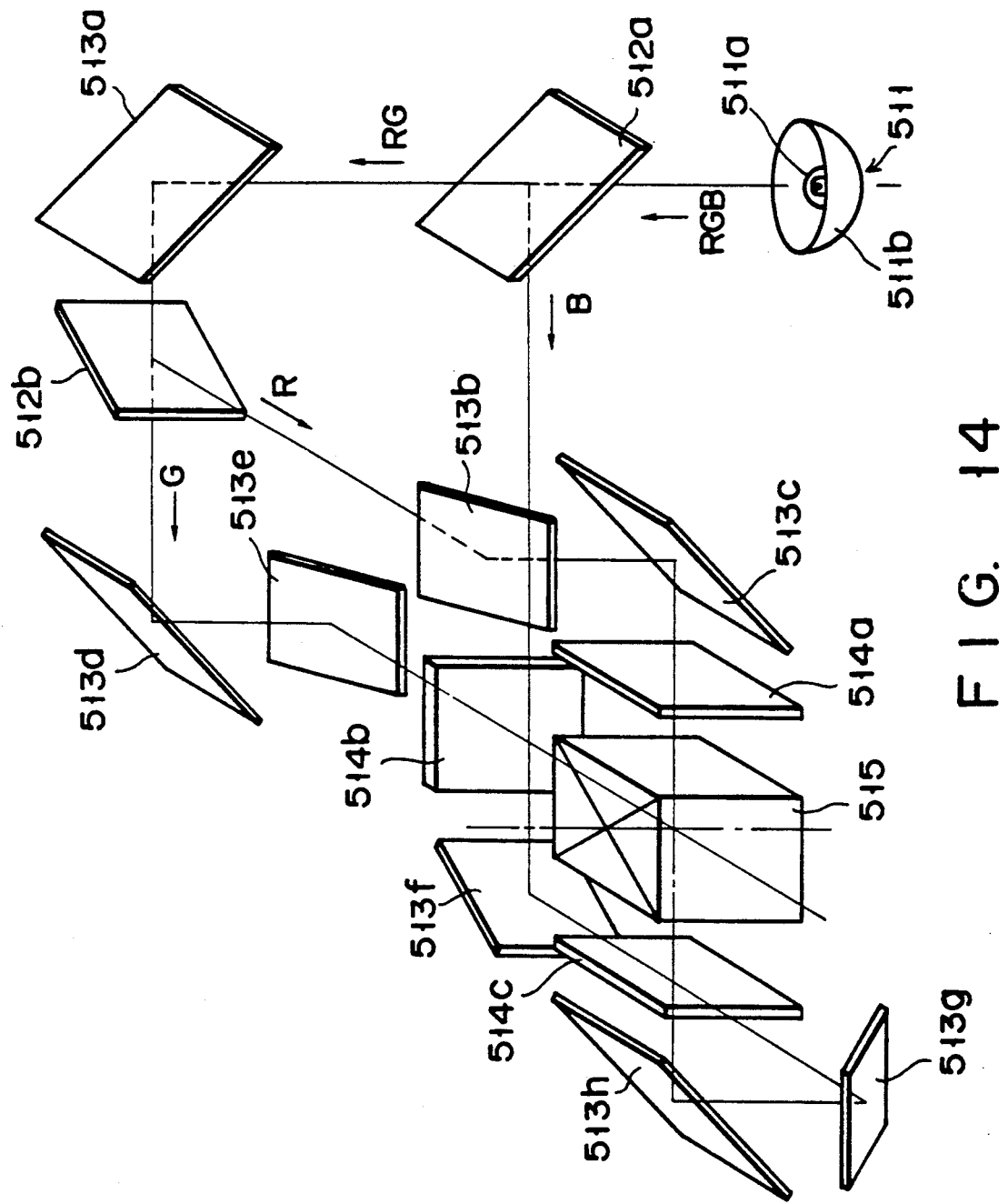
FIG. 14 is a perspective view illustrating the main section of a liquid crystal projector according to a sixth embodiment of the invention.
Figure 15:
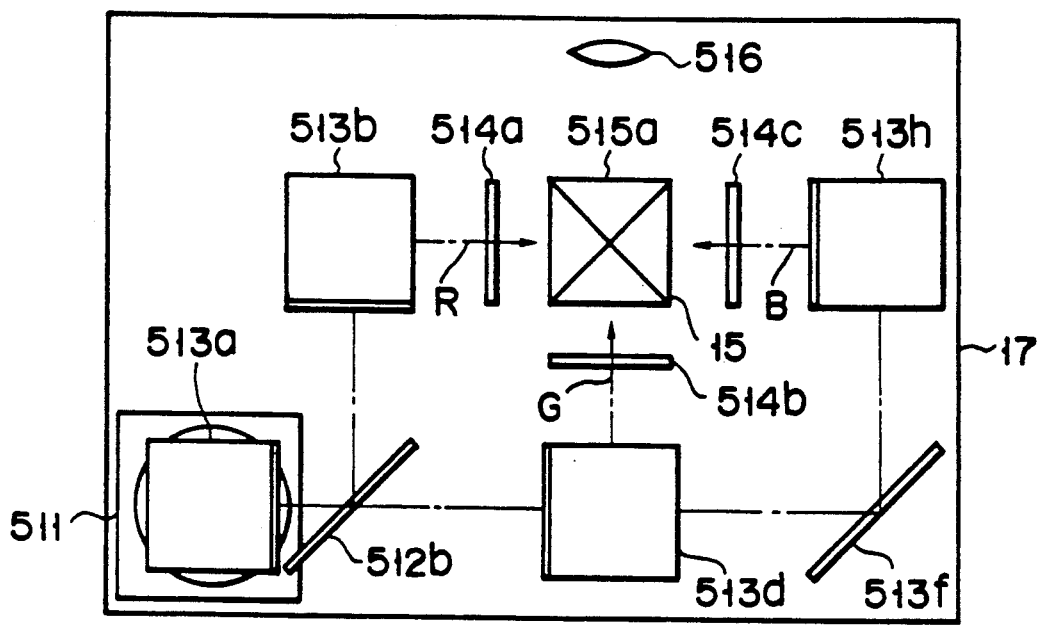
FIG. 15 is a plan view of the liquid crystal projector shown in FIG. 14.
Figure 16:
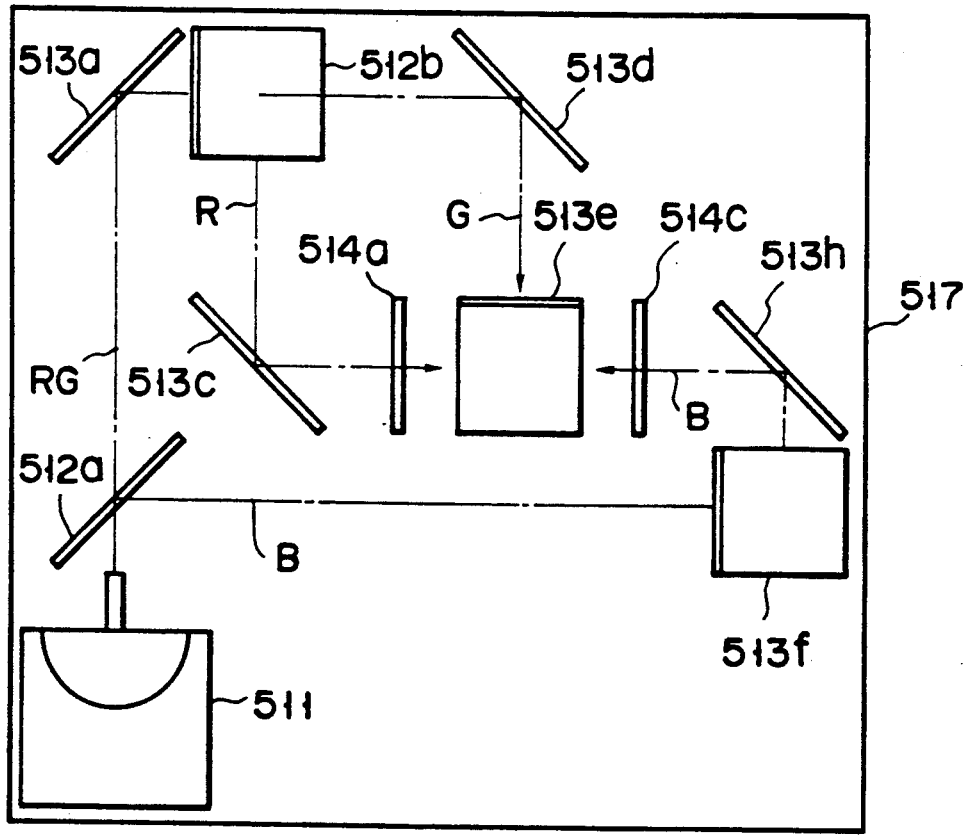
FIG. 16 is a front view of the liquid crystal projector illustrated in FIG. 14.
Figure 17:
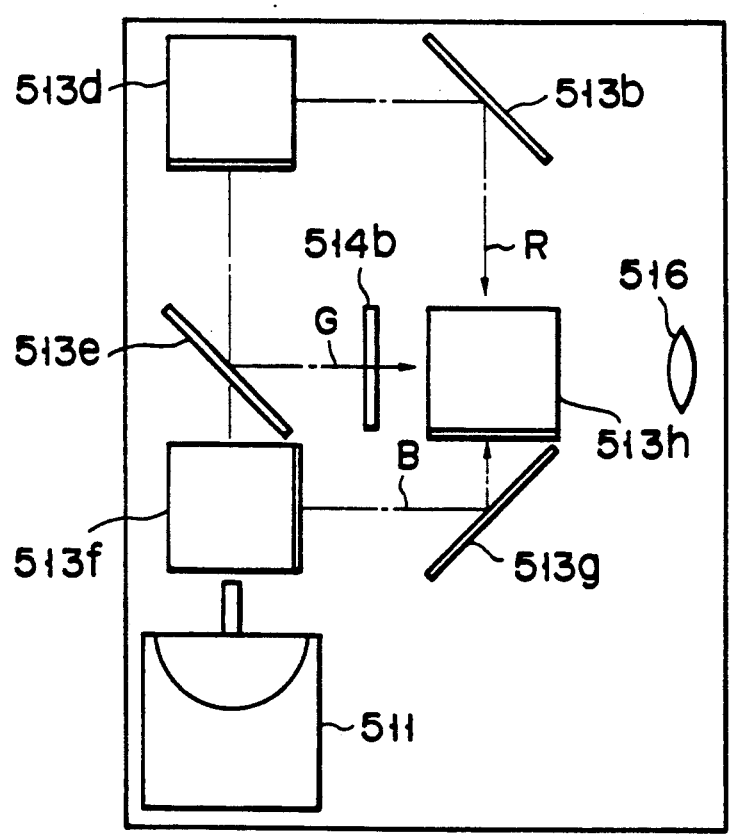
FIG. 17 is a right-side view of the projector shown in FIG. 14.

A sixth embodiment of the invention, which is also a liquid crystal projector, will now be described, with reference to FIGS. 14 and 19. FIG. 14 is a perspective view showing the main section of the LC projector. FIGS. 15 to 17 are a plan view, a front view, and a right-side view of the main section, respectively.

As is illustrated in FIGS. 14 to 17, this LC projector comprises a light source 511 comprising a high-luminance lamp 511a (e.g., a halogen lamp) and a reflector 511b. A first dichroic mirror 512a is located has the light-transmitting characteristic shown in FIG. 18. As is evident from FIG. 18, the dichroic mirror 512a allows the passage of a RG beam and reflects a blue beam B. A total-reflection mirror 513a is provided above the first dichroic mirror 512a, for reflecting the RG beam at right angles. A second dichroic mirror 512b is set in the optical path of the RG beam reflected from the mirror 513a. The second dichroic mirror 512b has the light-transmitting characteristic shown in FIG. 19. As is clearly understood from FIG. 19, the second dichroic mirror 512b allows the passage of a green beam G and reflects a red beam R.

Thus, the incandescent light the light source 511 has emitted is split into a blue beam and RG beam by means of the first dichroic mirror 512a, and the RG beam is a red beam and a green beam by means of the second dichroic mirror 512b. The red beam R is reflected by total-reflection mirrors 513b and 513c and applied to a red-image display LC panel 514a. The green beam G is reflected by total-reflection mirrors 513d and 513e and blue beam G is reflected by total-reflection mirrors 513f, 513g and 513h, and is applied to a blue-image display LC panel 514c. The LC panels 514a, 514b, and 514c are located, opposing the three sides of a dichroic prism 515, respectively. They form a red image, a green image, and a blue image, respectively. The red image, the green image, and the blue image are combined by the dichroic prism 515 into a color image. The color image is applied from the light-emitting surface of the dichroic prism 515 to a projection lens 516 shown in FIG. 15. The lens 516 magnifies the color image and projects the same onto a screen (not shown).

The dichroic mirrors 512a, 512b, and the mirrors 513a to 513h are placed in different planes within the case 517 of the main section, such that the optical paths of the beams R, G, and B, which extend from the light source 511 to the LC panels 514a, 514b, and 514c, respectively, have the same length. Therefore, the red beam R, the green beam G, and the blue beam B are luminance-distributed to the same degree. In addition, since the dichroic mirrors 512a and 512b and the total-reflection mirrors 513a to 513h are placed in different planes, the main section of the liquid crystal projector can be relatively small.

Seventh Embodiment

Figure 20:
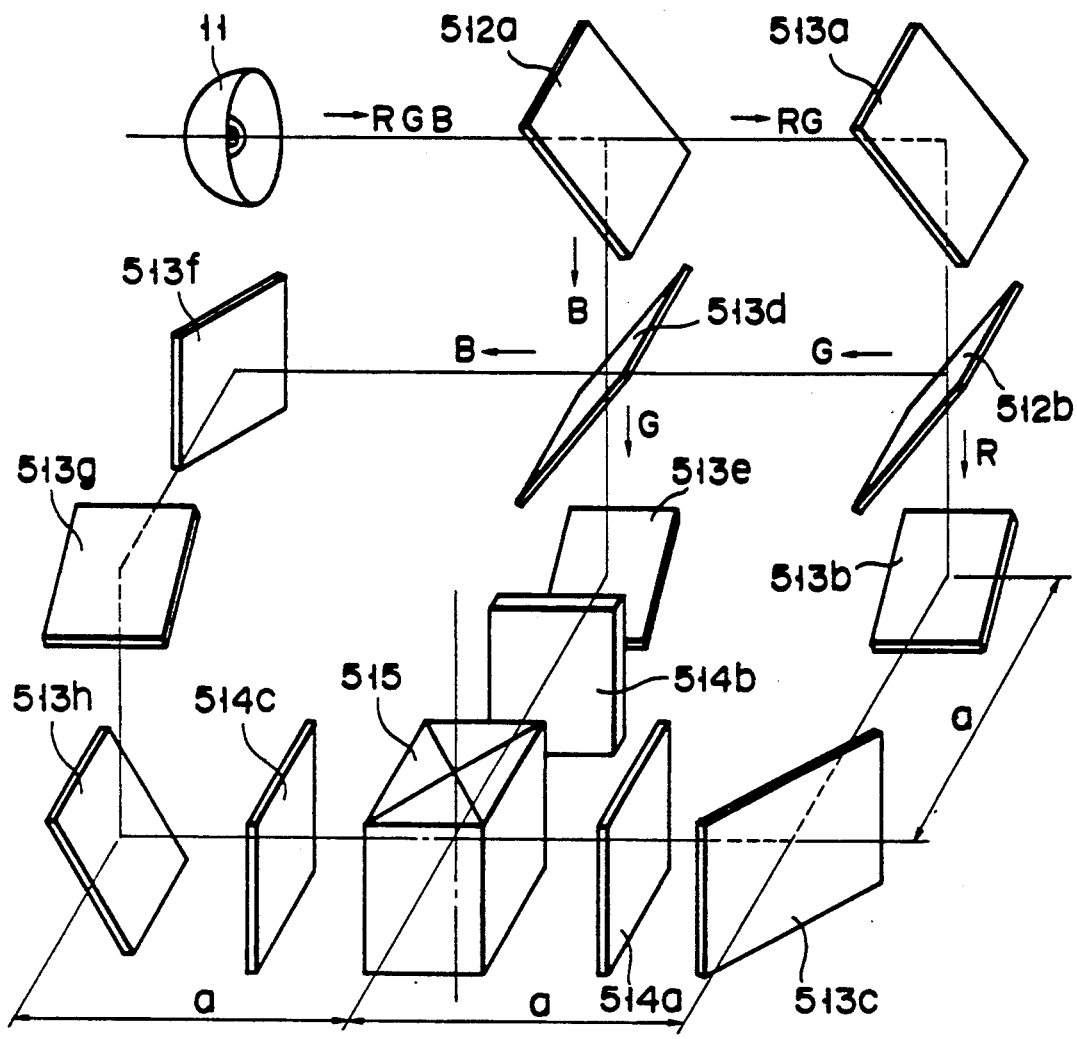
FIG. 20 is a perspective view showing the main section of a liquid crystal projector according to a seventh embodiment of the present invention.

A seventh embodiment of the invention, which is also a liquid crystal projector, will now be described, with reference to FIGS. 20 and 23. FIG. 20 is a perspective view showing the main section of the LC projector. FIGS. 21 to 23 are a plan view, a front view, and a right-side view of the main section, respectively.

As is illustrated in FIGS. 20 to 23, the LC projector is identical in structure to the LC projector shown in FIGS. 14 to 17, except that dichroic mirrors 512a and 512b and total-reflection mirrors 513a to 513h are placed in different planes, such that the distance among these mirrors are the same. The dichroic mirrors 512a has the light-transmitting characteristic represented in FIG. 24, and allows the passage of a beam RG and reflects a blue beam B. The dichroic mirrors 512b has the light-transmitting characteristic represented in FIG.

25, and allows the passage of a red beam R and reflects a green beam G. The total-reflection mirror 513d reflects light on both surfaces.

As has been explained, in both the sixth embodiment and the seventh embodiment, the light the light source 511 is split into three beams by means of the dichroic mirrors 512a and 512b, and these beams, i.e., a red beam R, a green beam G, and a blue beam B, are applied to the three LC panels 514a, 514b, and 514c, respectively. The beams R, G, and B, all emerging from the LC panels, are applied to the three light-receiving sides of the dichroic prism 515, and emerge from the same light-emitting surface of the prism 515. The dichroic mirrors 512a and 512b and the total-reflection mirrors 513a to 513h are placed in different planes such that the optical paths of the beams R, G, and B, which extend from the light source 511 to the LC panels 514a, 514b, and 514c, have the same length. Therefore, the red beam R, the green beam G, and the blue beam B are luminance-distributed to the same degree on the LC panels 514a, 514b, and 514c, respectively. As a result, the sixth and seventh embodiments are liquid crystal projectors which are small and can project a color image having good color balance.

Eighth Embodiment

An eighth embodiment of the present invention, which is a liquid crystal projector, too, will now be described with reference to FIGS. 26 and 27.

Figure 26:
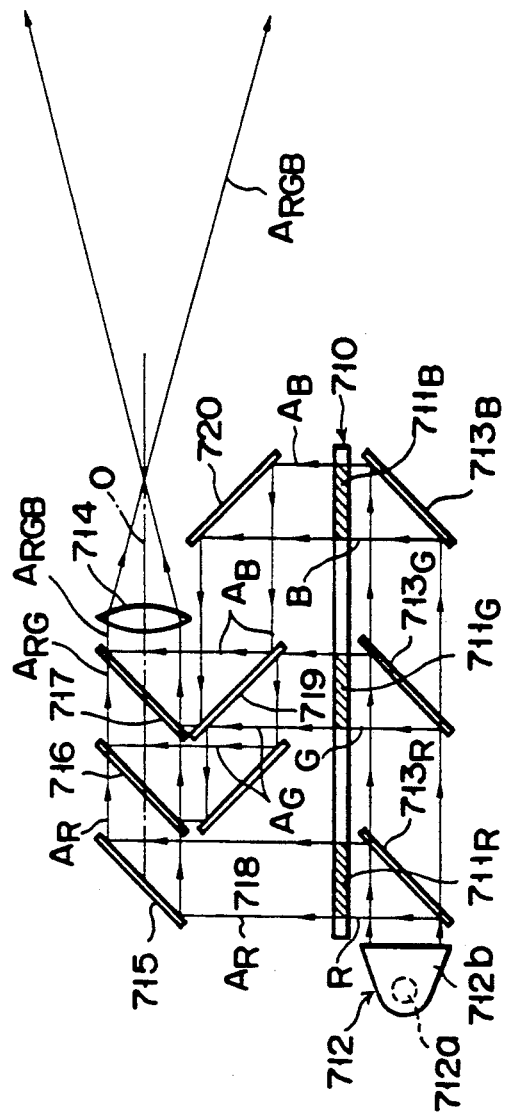
FIG. 26 is a plan view showing a liquid crystal projector according to a eighth embodiment of the invention.
Figure 27:
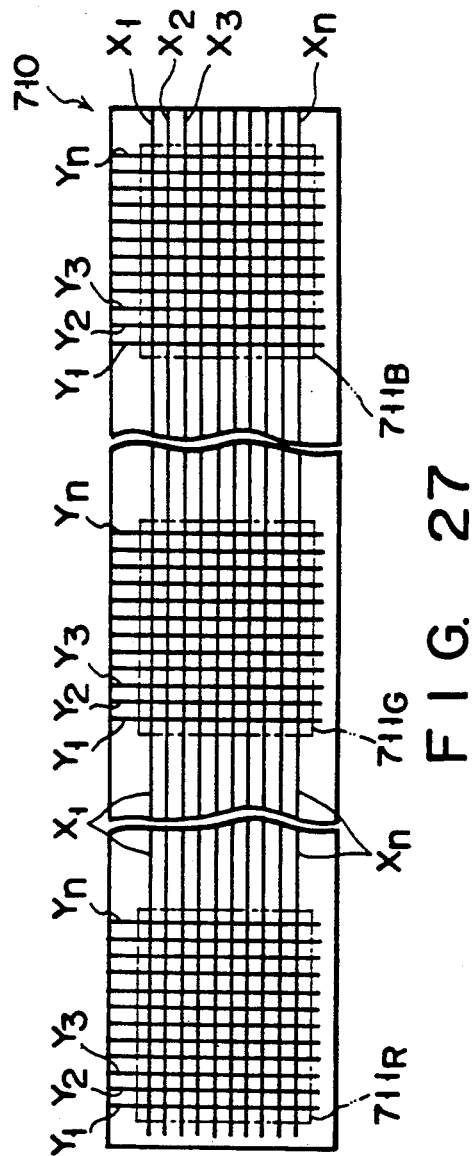
FIG. 27 is a plan view illustrating the display panel of the eight embodiment.
Figure 3:
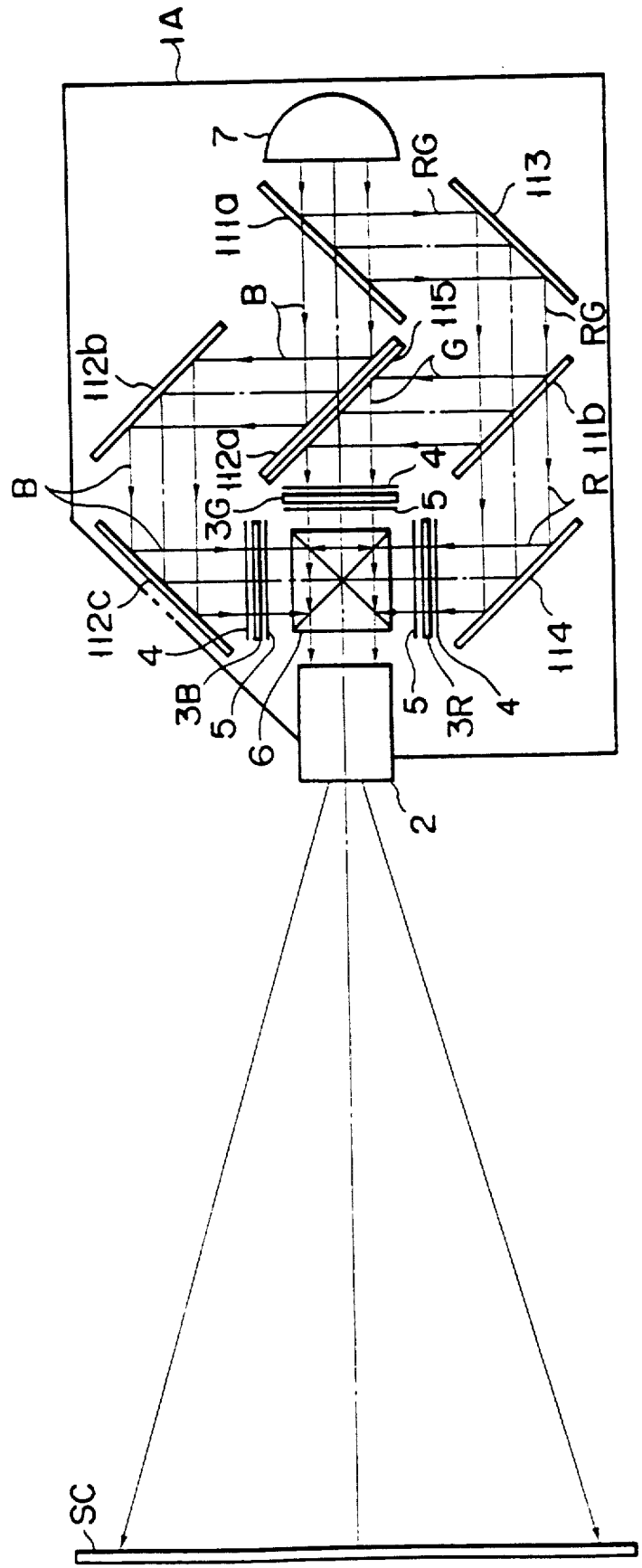

As is illustrated in FIG. 26, this liquid crystal projector comprises a liquid crystal panel 710 which consists of three display sections 711R, 711G, and 711B for displaying a red image, a green image, and a blue image, respectively. As is shown in FIG. 27, the display section 711R is the left-end portion of the panel 710, the display section 711G is the center portion thereof, and the display section 711B is the right-end portion thereof. The liquid crystal panel 710 comprises a pair of parallel, transparent substrates (not shown) and liquid crystal filled in the gap between these substrates. As is shown in FIG. 27, n strip-shaped, transparent scanning electrodes (common electrodes) X1 to Xn are formed on that surface of the first substrate which opposes the second substrate, and extend in the lengthwise direction of the substrate and parallel to one another. Three sets of stripe-shaped, transparent signal electrodes formed on that surface of the second substrate which opposes the first substrate. Each set consists of n signal electrodes Y1 to Yn. The electrodes Y1 to Yn of the first set intersect with the left-end portions of the scanning electrodes X1 to Xn at right angles the electrodes Y1 to Yn of the second set intersect with the middle portions of the scanning electrodes X1 to Xn at right angles, and the electrodes Y1 to Yn of the third set intersect with the right-end portions of the scanning electrodes X1 to Xn at right angles. The left-end portions of the scanning electrodes, the signal electrodes of the first set, and the left-end portions of both substrates constitute the red-image display section 711R. The middle portions of the scanning electrodes, the signal electrodes of the second set, and the middle portions of both substrates constitute the green-image display section 711G. The right-end portions of the scanning electrodes, the signal electrodes of the third set, and the right-end portions of both substrates constitute the blue-image display section 711B. The scanning electrodes X1 to Xn are sequentially applied with a scanning voltage. A red-image signal is supplied to the signal electrodes of the red-image display section 711R, the section 711R displays a red image. Similarly, a green-image signal is supplied to the signal electrodes of the green-image display section 711G, whereby the section 711G displays a green image. A blue-image signal is supplied to the signal electrodes of the blue-image display section 711B, whereby the section 711B display a blue image. The panel 710, which is a simple matrix type, can be replaced by a TFT (Thin-Film Transistor) active matrix type which comprises TFTs and pixel electrodes which are deriven by the TFTs.

As is illustrated in FIG. 26, the liquid crystal projector further comprises a light source 712. The light source 712 comprises a lamp 712a and a reflector 712b. The reflector 712b reflects the light emitted from the lamp 712a and applies it parallel to the liquid crystal panel 710. Three dichroic mirrors 713R, 713G, and 713B are arranged in the optical path of the light emitted from the light source 712. These mirrors 713R, 713G, and 713B are inclined at 45° to the light beam supplied from the light source 712. The mirror 713R reflects a red beam and passes any other beam. The mirror 713G reflects a green beam and passes any other beam. The mirror 713B reflects a blue beam and reflects any other beam. The red beam reflected by the dichroic mirror 713R is applied to the red-image display section 711R; the green beam reflected by the dichroic mirror 713G is applied to the green-image display section 711G; and the blue beam reflected by the dichroic mirror 713B is applied to the blue-image display section 711B.

A projection lens 714 is located on the light-emitting side of the liquid crystal panel 170, with its optical axis O extending substantially parallel to the panel 710 and, hence, also to the direction in which the display sections 711R, 711G, and 711B are arranged.

A red-image reflecting mirror 715 is located on the light-receiving side of the projection lens 714, for reflecting the red-image beam AR emerging from the red-image display section 711R and applying it to the projection lens 714. The mirror 715 is either a total-reflection mirror or a dichroic mirror. A first image-combining mirror 716 is located between the projection lens 714 and the red-image reflecting mirror 715, for passing the red-image beam $A_R$ to the lens 714, and for reflecting the green-image beam $A_G$ emerging from the green-image display section 711G and supplying the beam $A_G$ to the projection lens 714. A second image-combining mirror 717 is located between the projection lens 714 and the first image-combining mirror 716, for passing the red-image beam $A_R$ and the green-image beam $A_G$ toward the projection lens 714, and for reflecting the blue-image beam $A_B$ emerging from the blue-image display section 711B and supplying the beam $A_B$ to the projection lens 714. The image-combining mirrors 716 and 717 are dichroic mirrors. The mirrors 715, 716, and 717 are coaxial with the projection lens 714, and are inclined at 46° thereto. The red-image beam $A_R$ emerging from the red-image display section 711R is reflected by the mirror 715 and passes through both image-combining mirrors 716 and 717, and reaches the projection lens 714.

Two mirrors 718 and 719 are located between the liquid crystal panel 710, on the one hand, and the first and second image-combining mirrors 716 and 717, on the other hand. The mirror 718 is positioned beside the first image-combining mirror 716 and inclined at about 45° to the green-image beam $A_G$ emerging from the green-image display section 711G. The mirror 719, which reflects light on both surfaces, is set near the second image-combining mirror 717 and inclined at about 45° to the blue-image beam $A_B$ emerging from the blue-image display section 711B. The green-image beam $A_G$ is first reflected by the mirror 719 then is reflected again by the mirror 718, further is reflected by the first image-combining mirror 716, and the passes through the second image-combining mirror 717, and finally is applied to the projection lens 714. Another mirror 720 is positioned parallel to the mirror 719 and inclined at about 45° to the blue-image beam $A_B$ emerging from the blue-image display section 713B. Hence, the beam $A_B$ is first reflected by the mirror 720, again reflected by the mirror 719, and further reflected by the second image-combining mirror 717, and finally applied to the projection lens 714.

The mirrors 715, 716, and 717, which are located on the light-receiving side of the projection lens 714, and the mirrors 718, 719, and 720, which guide the image beams $A_G$ and $A_B$ from the display sections 711G and 711B to the projection lens 720, are positioned such that the image beams $A_R$, $A_G$, and $A_B$ have optical paths of the same lengths.

In the liquid crystal projector shown in FIG. 26, the incandescent light emitted from the light source 712 is split into a red beam, a green beam, and a blue beam, by means of the dichroic mirrors 713R, 713G, and 713B. The red beam, the green beam, and the blue beam are applied to the display sections 711R, 711G, and 711B, respectively. The red-image beam $A_R$ emerging from the display section 711R is reflected by the mirror 715 and applied to the projection lens 714 through the first and second image-combining mirrors 717. The green-image beam $A_G$ is guided by the mirrors 719 and 718 to the first image-combining mirror 716, then reflected by the mirror 716, and supplied to the lens 714 through the second image-combining mirror 717. The blue-image beam $A_B$ is guided by the mirrors 720 and 719, then reflected by the second image-combining mirror 717, and supplied to the lens 714. Therefore, the mirror 716 combines the red-image beam $A_R$ reflected from the mirror 715 with the green-image beam $A_G$ reflected from the mirror 718, forming a combined image beam $A_{RG}$. This image beam $A_{RG}$ passes through the second image-combining mirror 717, and is combined with the blue-image beam $A_B$, forming a full-color image beam $A_{RGB}$. The projection lens 714 applies the full-color image beam $A_{RGB}$ onto the screen (not shown), whereby a color image is displayed thereon.

As has been explained, the mirror 715, the first image-combining mirror 716, and the second image-combining mirror 717 cooperate, combining the red-image beam $A_R$, the green-image beam $A_G$, and the blue-image beam $A_B$, having emerged from the display sections 711R, 711G, and 711B of the liquid crystal panel 710, into a full-color image beam $A_{RGB}$. The liquid crystal projector requires no dichroic prism to project a full-color image onto the screen. Therefore, the liquid crystal projector can be manufactured at lower cost than the conventional projector shown in FIG. 4 which must be equipped with a dichroic prism. In addition, since the mirrors 715 to 720 are located such that the optical paths of the image beams $A_R$, $A_G$, and $A_B$, which extend from the display sections 711R, 711G, and 711B to the projection lens 714, have substantially the same length. The image beams $A_R$, $A_G$, and $A_B$, forming the full-color image beam $A_{RGB}$, are therefore balanced well in luminance, and the image projected on the screen has a good color balance.

In the eighth embodiment (FIG. 26), the mirror 719 has two light-reflecting surfaces and reflects two beams, i.e., the green-image beam $A_G$ and the blue-image beam $A_B$. This mirror 719 can be replaced by two mirrors, each having one light-reflecting surface.

As has been described the red-image beam AR emerging form the display section 711R is reflected only once before reaching the projection lens 714, whereas the green-image beam $A_G$ and the blue-image beam $A_B$ are reflected more than once before reaching the lens 714, so that the optical paths of the beams $A_R$, $A_G$, and $A_B$ have substantially the same length. Instead, a mirror can be used, in addition to the mirror 715, to reflect the red-image beam $A_R$. In this case, too, the three image beams have substantially the same luminance when they reach the projection lens 714, and form, on the screen, a full-color image of good color balance, only if all mirrors used are located such that the optical paths of the image beams $A_R$, $A_G$, and $A_B$ have substantially the same length.

As has been explained, the dichroic mirrors 713R, 713G, and 713B split the incandescent light emitted from the light source 712, into a red beam R, a green beam G, and a blue beam B, and these beams R, G, and B are applied to the display sections 711R, 711G, and 711B of the liquid crystal panel 210. The dichroic mirrors 713R, 713G, and 713B can be replaced by a red filter, a green filter, and a blue filter which are located in front of the light-receiving surfaces of the display sections 711R, 711G, and 711B, respectively. If this is the case, three incandescent-light sources need to be located, opposing the display sections 711R, 711G, and 711B.

Further, instead of the single liquid crystal panel 710, use can be made of three liquid crystal panels which correspond to the display sections 711R, 711G, and 711B, respectively. Moreover, these liquid crystal panels can be replaced by cathode-ray tubes.

Moreover, each of the display sections 711R, 711G, and 711B can be made of two sub-sections, one for displaying the first half of an image, and the other for displaying the second half thereof. In this case, the six image beams emerging from the six sub-sections are combined into a full-color image beam. Further, the image display sections 711R, 711G, and 711B can be replaced by two image display sections placed in the same plane. In this case, the first section displays one or two of the red, green and blue images, and the second section displays the remaining image or images, and the image beam or beams emerging from the first section are combined with the image beam or beams emerging from the second section, into a full-color image beam.

What is claimed is:

1. A liquid crystal projector, comprising:
   light source means;
   first to third liquid crystal panels;
   a projection lens;
   optical means for splitting light emitted from said light source means into three beams of primary colors, and for guiding the three beams to said projection lens via said first to third liquid crystal panels, respectively, along three optical paths having substantially equal length;
   wherein said optical means includes a plurality of dichroic mirrors and a plurality of mirrors; and wherein said dichroic mirrors and said mirrors are arranged three-dimensionally.

2. A liquid crystal projector, comprising:
light source means;
first to third liquid crystal panels;
a projection lens;
optical means for splitting light emitted from said light source means into three beams of primary colors, and for guiding the three beams to said projection lens via said first to third liquid crystal panels, respectively, along three optical paths having substantially equal length; and
wherein said optical means includes a mirror having two total-reflection light-reflecting surfaces, one of which is arranged to reflect a beam of a primary color and the other of which is arranged to reflect a beam of another primary color.

3. A liquid crystal projector, comprising:
light source means;
first to third liquid crystal panels;
a projection lens;
optical means for splitting light emitted from said light source means into three beams of primary colors, and for guiding the three beams to said projection lens via said first to third liquid crystal panels, respectively, along three optical paths having substantially equal length; and
wherein said optical means includes:
a first dichoric mirror for transmitting a first color beam emitted from said light source means, and reflecting the beams of second and third color beams;
a first mirror for reflecting the beams of the second and third color beams reflected by said first dichoric mirror and applying these beams in a direction parallel to, and the same as, the first color beam transmitted through said first dichoric mirror;
a second dichoric mirror for transmitting the second color beam reflected by said first mirror, and reflecting the third color beams in a direction parallel to, and opposite to, the second and third color beams reflected by said first dichroic mirror;
a second mirror for reflecting the first color beam transmitted through said first dichroic mirror and applying this beam in the same direction as the third color beam reflected by said second dichroic mirror;
a third mirror for reflecting the first color beam reflected by said second mirror and applying this beam in direction parallel to, and the same as, the first color beam transmitted through said first dichroic mirror;
a fourth mirror for reflecting the first color beam reflected by said third mirror and applying this beam in a direction parallel to, and opposite to, the first color beam reflected by said second mirror;
a fifth mirror for reflecting the second color beam transmitted through said second dichroic mirror and applying this beam in a direction parallel to, and the same as, the third color beam reflected by said second dichroic mirror;
a sixth mirror for reflecting the third color beam reflected by said second dichroic mirror and applying this beam in the same direction as the first color beam transmitted through said first dichroic mirror; and a dichroic prism for superposing the first, second and third color beams which are transmitted through said first to third liquid crystal panels, respectively, and thereby outputting a full-color image beam.

4. A liquid crystal display apparatus comprising:
light source means;
first to third liquid crystal panels;
first optical means for applying light emitted from said light source means, to said first to third liquid crystal panels;
second optical means for projecting light beams emerging from said first to third liquid crystal panels;
third optical means for guiding beams emerging from said first to third liquid crystal panels, such that these beams have optical paths of substantially equal length; and
wherein said third optical means includes two convex lenses; and
wherein said two convex lenses are located such that their focal points coincide.

5. A liquid crystal projector comprising:
light source means;
first to third liquid crystal panels;
first optical means for applying light emitted from said light source means, to said first to third liquid crystal panels;
second optical means including a projection lens for projecting three light beams emitted from said first to third liquid crystal panels; and
third optical means for guiding beams emerging from said first to third liquid crystal panels, such that these beams have substantially equal luminance when reaching said projection lens;
wherein said third optical means includes two convex lenses; and
wherein said two convex lenses are located such that their focal points coincide.

6. A liquid crystal projector comprising:
light source means;
first to third liquid crystal panels;
first optical means for applying light emitted from said light source means, to said first to third liquid crystal panels;
second optical means including a projection lens for projecting three light beams emitted from said first to third liquid crystal panels; and
third optical means for guiding beams emerging from said first to third liquid crystal panels, such that these beams have substantially equal luminance when reaching said projection lens;
wherein said third optical means is a light-transmitting member; and
wherein said light-transmitting member has a refractive index n which satisfies the following equation:

$$L = (1 - n'/n)d$$

where L is the difference between the length of the longer optical paths of two of the three beams and that of the shorter optical path of the remaining beam, n' is the refractive index of air, and d is the width of said light-transmitting member as measured in the direction in which the beams pass through said light-transmitting member.

7. A liquid crystal display apparatus comprising:
liquid crystal projector comprising:
light source means;

first to third liquid crystal panels;

first optical means for applying light emitted from said light source means, to said first to third liquid crystal panels;

second optical means for projecting light beams emerging from said first to third liquid crystal panels;

third optical means for guiding beams emerging from said first to third liquid crystal panels, such that at least one of the three beams having a longer optical path is less diverged than at least one of the remaining beams having a shorter optical path;

wherein said third optical means is a light-transmitting member; and wherein said light-transmitting member has a refractive index n which satisfies the following equation:

$$L = (1 - n'/n)d$$

where L is the difference between the length of the longer optical paths of two of the three beams and that of the shorter optical path of the remaining beam, n' is the refractive index of air, and d is the width of said light-transmitting member as measured in the direction in which the beams pass through said light-transmitting member.

8. A liquid crystal projector comprising:

light source means;

liquid-crystal display panel means having a plurality of image-display sections for receiving the light emitted from said light source means and outputting image beams;

a projection lens for projecting the image beams supplied from said liquid-crystal display panel means;

first mirror means located on the light-receiving side of said projection lens, for reflecting the image beam supplied from the first image-display section and applying this image beam toward said projection lens;

second mirror means located between said first mirror means and said projection lens, for reflecting the image beam supplied from the second image-display section and applying this beam toward said projection lens, and for passing the image beam reflected by said first mirror means;

third mirror means for reflecting at least one of the two image beams to be guided to said first and second mirror means, respectively; and means locating said first to third mirror means such that the image beams have optical paths of the same length which extend from said image-display sections to said projection lens.

9. A liquid crystal projector comprising:

light source means;

first to third liquid crystal panels;

a projection lens; and optical means for splitting light emitted from said light source means into three beams of primary colors, and guiding the three beams to said projection lens via said first to third liquid crystal panels;

wherein said optical means includes a mirror having two total-reflection light-reflecting surfaces, one of which is arranged to reflect a beam of a primary color and the other of which is arranged to reflect a beam of another primary color.

* * * * *

UNITED STATES PATENT AND TRADEMARK OFFICE
CERTIFICATE OF CORRECTION

PATENT NO. : 5,097,323

DATED : March 17, 1992

INVENTOR(S) : SATO et al

It is certified that error appears in the above-identified patent and that said Letters Patent is hereby corrected as shown below:

Title Page:
Section [56] References Cited, under "U.S. Patent Documents", insert the following references:

| | | |
|---|---|---|
| 4,425,028 | 1/1984 | R.J. Gagnon......350/337 |
| 4,461,542 | 7/1984 | R.J. Gagnon......350/331R |
| 4,613,207 | 9/1986 | J.L. Fergason....350/331R |
| 4,715,684 | 12/1987 | R.J. Gagnon......350/331R |

Sheet 3 of the drawings, consisting of Fig. 3, should be deleted to be replaced with the corrected Fig. 3, as shown on the attached page.

Signed and Sealed this

Twenty-eighth Day of June, 1994

Attest:

BRUCE LEHMAN

Attesting Officer

Commissioner of Patents and Trademarks